US012265539B2

(12) United States Patent
Chipman et al.

(10) Patent No.: US 12,265,539 B2
(45) Date of Patent: Apr. 1, 2025

(54) SYSTEMS AND METHODS FOR MANAGING STRUCTURED QUERY LANGUAGE ON DYNAMIC SCHEMA DATABASES

(71) Applicant: MongoDB, Inc., New York, NY (US)

(72) Inventors: Ryan Chipman, Westwood, MA (US); Patrick Meredith, New York, NY (US); Matthew Chiaravalloti, New York, NY (US); Huan Li, Jersey City, NJ (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 17/856,379

(22) Filed: Jul. 1, 2022

(65) Prior Publication Data

US 2023/0039860 A1    Feb. 9, 2023

Related U.S. Application Data

(60) Provisional application No. 63/219,885, filed on Jul. 9, 2021, provisional application No. 63/220,297, filed on Jul. 9, 2021.

(51) Int. Cl.
| | |
|---|---|
| *G06F 16/00* | (2019.01) |
| *G06F 16/21* | (2019.01) |
| *G06F 16/22* | (2019.01) |
| *G06F 16/242* | (2019.01) |
| *G06F 16/2455* | (2019.01) |

(52) U.S. Cl.
CPC ...... *G06F 16/24553* (2019.01); *G06F 16/211* (2019.01); *G06F 16/2291* (2019.01); *G06F 16/2433* (2019.01)

(58) Field of Classification Search
CPC .......... G06F 16/24553; G06F 16/2433; G06F 16/2291; G06F 16/211
See application file for complete search history.

(56) References Cited

U.S. PATENT DOCUMENTS

| | | | |
|---|---|---|---|
| 11,567,735 B1* | 1/2023 | Kulkarni | G06F 16/24537 |
| 2013/0117288 A1* | 5/2013 | De Smet | G06F 16/2448 |
| | | | 707/E17.062 |
| 2015/0039641 A1* | 2/2015 | Neeman | G06F 16/3331 |
| | | | 707/760 |

(Continued)

*Primary Examiner* — Alex Gofman
*Assistant Examiner* — Suman Rajaputra
(74) *Attorney, Agent, or Firm* — Wolf, Greenfield & Sacks, P.C.

(57) ABSTRACT

In various aspects of the present disclosure, systems and methods are described to identify and resolve structured queries so they execute consistently and accurately against any data architecture, and for example, dynamic or unstructured database stores. According to one embodiment, a dynamic schema data system implements a query dialect that is configured to expose underlying flexible schemas of the dynamic schema data system, any structured data, unstructured or partially structured data, and expressive querying native to the dynamic schema system in a language that is compatible with structured queries, and for example, compatible with SQL-92. In further embodiments, the query dialect is configured to enable consistency with existing dynamic schema database query semantics (e.g., the known MongoDB database and associated query semantics).

20 Claims, 6 Drawing Sheets

(56) References Cited

U.S. PATENT DOCUMENTS

2015/0120699 A1* 4/2015 Faerber ............ G06F 16/24542
707/718
2017/0262516 A1* 9/2017 Horowitz .............. G06F 16/254
2019/0236182 A1* 8/2019 Tiyyagura ........... G06F 16/2453

* cited by examiner

*Example Data, Query, and Result*

$\rho_c$: ⟨ test: {
    foo: [
       {'a': 24.5},
       {'a': 999}
    ],
    bar: [
       {'a':41, 'b':42},
       {'a':21, 'c':23}
    ]
  }
⟩
$\rho_0$ : ⟨⟩

SELECT *
FROM test.foo AS x CROSS JOIN test.bar AS y
WHERE x.a > y.a

1. FROM test.foo as x CROSS JOIN test.bar as y
   $FROM_{in} = (\rho_0, c^{FROM}_{in} = [])$
   $FROM_{out} = WHERE_{in} = (\rho_0, c^{WHERE}_{in} = [$
     ⟨(x, 0): {a: 24.5}, (y, 0): {a: 41, b: 42}⟩,
     ⟨(x, 0): {a: 24.5}, (y, 0): {a: 21, c: 23}⟩,
     ⟨(x, 0): {a: 999}, (y, 0): {a: 41, b: 42}⟩,
     ⟨(x, 0): {a: 999}, (y, 0): {a: 21, c: 23}⟩
     ])

2. WHERE x.a > y.a
   $WHERE_{out} = SELECT_{in} = (\rho_0, c^{SELECT}_{in} = [$
     ⟨(x, 0): {a: 24.5}, (y, 0): {a: 21, c: 23}⟩,
     ⟨(x, 0): {a: 999}, (y, 0): {a: 41, b: 42}⟩,
     ⟨(x, 0): {a: 999}, (y, 0): {a: 21, c: 23}⟩
     ])

3. SELECT *
   $SELECT_{out} = (\rho_0, RESULT = [$
     ⟨(x, 0): {a: 24.5}, (y, 0): {a: 21, c: 23}⟩,
     ⟨(x, 0): {a: 999}, (y, 0): {a: 41, b: 42}⟩,
     ⟨(x, 0): {a: 999}, (y, 0): {a: 21, c: 23}⟩
     ])

FIG. 4

*Example Grammar for type aliases and rewrites*

```
<type> ::= <double type> | <string type> | <document type>
      | <array type> | <binary type> | < undefined type>
      | <objectId type> | <boolean type> | <date type>
      | <null type> | <regular expression type> | <dbPointer type>
      | <javascript type> | <symbol type>
      | <javascriptWithScope type> | <32-bit integer type>
      | <timestamp type> | <64-bit integer type>
      | <decimal128 type> | <min key type> | <max key type>

<double type>            ::= DOUBLE PRECISION?
                         | REAL
                         | FLOAT ("(" <integer literal> ")")?
<string type>            ::= STRING
                         | VARCHAR ("(" <integer literal> ")")?
                         | CHAR ("(" <integer literal> ")")?
                         | CHARACTER ("(" <integer literal> ")")?
                         | CHAR VARYING (
                             "(" <integer literal> ")")?
                         | CHARACTER VARYING (
                             "(" <integer literal> ")")?
<document type>          ::= DOCUMENT
<array type>             ::= ARRAY
<binary data type>       ::= BINDATA
<undefined type>         ::= UNDEFINED
<objectId type>          ::= OBJECTID
<boolean type>           ::= BOOL | BIT | BOOLEAN
<datetime type>          ::= BSON_DATE | TIMESTAMP
<null type>              ::= NULL
<regular expression type> ::= REGEX
<dbPointer type>         ::= DBPOINTER
<javascript type>        ::= JAVASCRIPT
<symbol type>            ::= SYMBOL
<javascriptWithScope type> ::= JAVASCRIPTWITHSCOPE
<32-bit integer type>    ::= INT | INTEGER | SMALLINT
<timestamp type>         ::= BSON_TIMESTAMP
<64-bit integer type>    ::= LONG
<decimal128 type>        ::= DECIMAL ("(" <integer literal> ("," 
                             <integer literal>)? ")")?
                         | DEC ("(" <integer literal> ("," 
                             <integer literal>)? ")")?
                         | NUMERIC ("(" <integer literal> ("," 
                             <integer literal>)? ")")?
<min key type>           ::= MINKEY
<max key type>           ::= MAXKEY
```

FIG. 5

*Example Rewriting Functions:*

Rewriting SELECT ... with no FROM clause
SELECT ...
is rewritten as:
SELECT ... FROM [{}] AS _dual
Rewriting SELECT x.y.a, b, ... where x.y.a and b are field references
SELECT x.y.a, b, ...
is rewritten as:
SELECT x.y.a AS a, b AS b, ...
Rewriting SELECT <expression1>, <expression2>, ...
SELECT <expression1>, <expression2>, ...
is rewritten as:
SELECT <expression1> AS _1, <expression2> AS _2
Where _1 and _2 are names generated by the implementation corresponding to position in the resulting documents, starting at 1 because SQL traditionally numbers the first column as 1.
Rewriting SELECT <expression$_1$> AS x$_1$, <expression$_2$> as x$_2$, ..., t.*, ...
SELECT <expression$_1$> AS x$_1$, <expression$_2$> as x$_2$, ..., t.*, ...
is rewritten as:
SELECT VALUES {x$_1$: <expression$_1$>, x$_2$: <expression$_2$>}, ..., t.*, ...
Semantics of SELECT *
SELECT * will return binding tuples from the input stream unmodified. Other expressions may not be present in the select list alongside *.

*Example Grammar*
<select clause> ::= SELECT <set quantifier>? <value keyword>
    <select value list>
    | SELECT <set quantifier>? <select list>
<value keyword> ::= VALUE | VALUES
<set quantifier> ::= ALL
<select value list> ::= <select value expr> (, <select value expr>)*
<select value expr> ::= <expression> | <substar expr>
<select list> ::= <select expr> (, <select expr>)*
<select expr> ::= "*"
    | <substar expr>
    | <aliased expr>
<alias> ::= AS? <identifier>
<aliased expr> ::= <expression> <alias>?
<substar expr> ::= <identifier> "." "*"

FIG. 6

SYSTEMS AND METHODS FOR MANAGING STRUCTURED QUERY LANGUAGE ON DYNAMIC SCHEMA DATABASES

RELATED APPLICATIONS

This application claims priority under 35 U.S.C. § 119 to U.S. Provisional Application Ser. No. 63/219,885, entitled "SYSTEMS AND METHODS FOR MANAGING STRUCTURED QUERY LANGUAGE ON DYNAMIC SCHEMA DATABASES" filed Jul. 9, 2021, which is incorporated by reference herein in its entirety. This application claims priority under 35 U.S.C. § 119 to U.S. Provisional Application Ser. No. 63/220,297, entitled "SYSTEM AND METHOD FOR MANAGING A DISTRIBUTED DATABASE," filed Jul. 9, 2021, which is incorporated by reference herein in its entirety.

COPYRIGHT NOTICE

At least a portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Dynamic schema and/or unstructured datasets permit flexibility in data organization and architecture which provides advantage in terms of adaptability and compatibility with various data environments. This is unlike known relational or static data schema databases, where there can be no or limited constraints on data format. This flexibility poses many issues for some of the most common query languages, for example, SQL. SQL stands for structured query language and typically relies on a consistent data format as part of query execution to return consistent and accurate results. When SQL is executed against dynamic data the results can be unexpected, random, and/or fail entirely.

SUMMARY

In various aspects of the present disclosure, systems and methods are described to identify and resolve structured queries so they execute consistently and accurately against any data architecture, and for example, dynamic or unstructured database stores. According to one embodiment, a dynamic schema data system implements a query dialect (e.g., "MongoSQL") that exposes underlying flexible schemas of the dynamic database, any structured data, and expressive querying native to the dynamic schema system in a language that is compatible with structured queries, and for example, compatible with SQL-92. In further embodiments, the query dialect is configured to enable consistency with existing dynamic schema database query semantics (e.g., the known MongoDB database and associated query semantics). In some embodiments, the query dialect is implemented in a dynamic schema database that includes data lake functionality and implementation. Co-pending U.S. patent application Ser. No. 16/895,340, filed on Jun. 8, 2020, and U.S. patent application Ser. No. 17/341,896, filed on Jun. 8, 2021, describe examples of a dynamic, unstructured, and/or non-relational database implementation including data lake functionality, and are incorporated by reference herein in their entirety. The various examples can be augmented as discussed herein to include the query dialect that bridges such databases with structure query language interpretation.

The known MongoDB database includes a MySQL-based dialect invoked by a business integration connector. Various embodiments of the system include the query dialect that improves over the MySQL-based dialects. For example, the query dialect provides full compatibility with the known SQL-92 standard and preserves the query semantics of the underlying query language on which the structured queries are mapped. Prior implementation (MySQL-based dialect) was limited and failed to provide connections to any underlying flexible schema, structured data and fully expressive queries in place. Thus some embodiments provide significant improvement to the limited structures dialects previously available.

In further example, the prior attempts at a structured dialect accomplished an original goal of making it possible for business integration tools to connect to a dynamic schema (e.g., MongoDB) database. However to achieve this goal, the prior dialects compromised on expressiveness, performance, and limited the user experience/tooling available in the underlying database in order to match relational-database assumptions that do not apply to non-relational databases.

According to some aspects, by enabling the system to match on SQL-92 query semantics (instead of MySQL's), the system is configured to generate smaller, more idiomatic expressions (e.g., MongoDB consistent). Further, embodiments of the system can be architected to closely mirror operation of the native dynamic schema database which makes any implementation less confusing for users who normally operate on the native database. In further example, the system is configured to require less $convert usage as part of the dialect. $convert is an aggregation pipeline operator employed heavily in the MySQL-based dialect that converts an input value to a specified value type. For example, the operator can convert any valid expression to a double, string, ObjectId, boolean, Date, integer, long, or decimal, among other options. Further limiting prior implementation, not all types can be converted to any other type, and some types can only be converted from a subset of the available data types. The various embodiments of the aggregation framework can leverage the described dialect and system embodiments to execute structured queries against native/expressive queries.

In some embodiments, the system is configured to provide a static, structural type system to enable execution of structural query language in non-relational data architectures. For example, "static" refers to a variable/expression that has a single type that is determined at compile time and does not change during the execution of the query. In another example, "structural" refers to a "type" that is a description of the structure of the document. In various embodiments, the type system is configured to perform compile-time type checking (e.g., regardless of the existence of schema information about the source data). Further embodiments are configured to use schema information available for source data (if it exists), and also infers schema information from the query itself (even if there is no schema information). In some examples, the type system enables operation to (among other things) perform static type-checking and result-set-metadata computation without source schema information and without actually having to execute a query. This improves over known approaches that often cannot identify errors until execution, resulting in massive computational waste. According to various embodiments, implementation of static type inference and result set metadata even for schemaless/partial-schema datasets enables at least in part the ability to not impose a static datasource schema on non-relational data in order to provide structured query language services. (e.g., like in the MySQL-based dialect referenced above).

According to various embodiments, the system is configured to enable, for example, data analysts and data stewards (who are mostly experienced with tools powered by SQL) to achieve the same level of success or interaction with non-relational database systems enjoyed by application developers who are often already familiar with JSON, JavaScript, and other object-oriented languages. This enhanced functionality and useability is enabled by various embodiments of the query dialect, improving over many conventional database implementations.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. Various aspects, embodiments, and implementations discussed herein may include means for performing any of the recited features or functions.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 4 is an example query execution shown in example environments, according to one embodiment;

FIG. 5 illustrates examples of a linked grammar, syntax, and query semantics of an example construct, according to one embodiment; and FIG. 6 shows example type aliases and rewrites, according to one embodiment.

DETAILED DESCRIPTION

Stated broadly, various aspects of the disclosure address problems associated with using structured query languages on database implementations that do not require any particular data structure or format. Typically structured queries fail or return inconsistent output when executed on dynamic schema data. Various embodiments implement a new query dialect configured to expose any underlying flexible schemas of the dynamic database (and/or generate the same), any structured data, and expressive querying native to any connected dynamic schema database system.

According to one embodiment, the native dynamic schema database can include an aggregation pipeline for executing queries according to stages of execution. Co-pending U.S. application Ser. No. 15/604,879, filed on May 25, 2017, incorporated by reference herein, describes an example framework for execution of aggregation pipelines. In further embodiments, the aggregation pipeline can include a new $sql aggregation stage configured to execute structured query language statements on dynamic schema, structured data, and datalake data. In some embodiments, the system is configured to employ the query dialect in a stage of query execution (e.g., in the aggregation pipeline) or responsive to aggregation operation $sql and user specified parameters. In further embodiments, schemas are not required by the system to execute structured query language queries on the underlying database data. In some examples, the query dialect is configured to map user queries to all SQL-92 operations and provide additional query operations that execute against dynamic schema data, unstructured data, and/or structured data.

According to one embodiment, the system is configured to accept and execute queries based on the data definition language "DDL" and data manipulation language "DML." In some examples, the system can be configured to provide read only access for queries based on DDL/DML to ensure consistency. Further examples, provide access and modification capability to dynamic schema data via DDL/DML.

Figure 1:
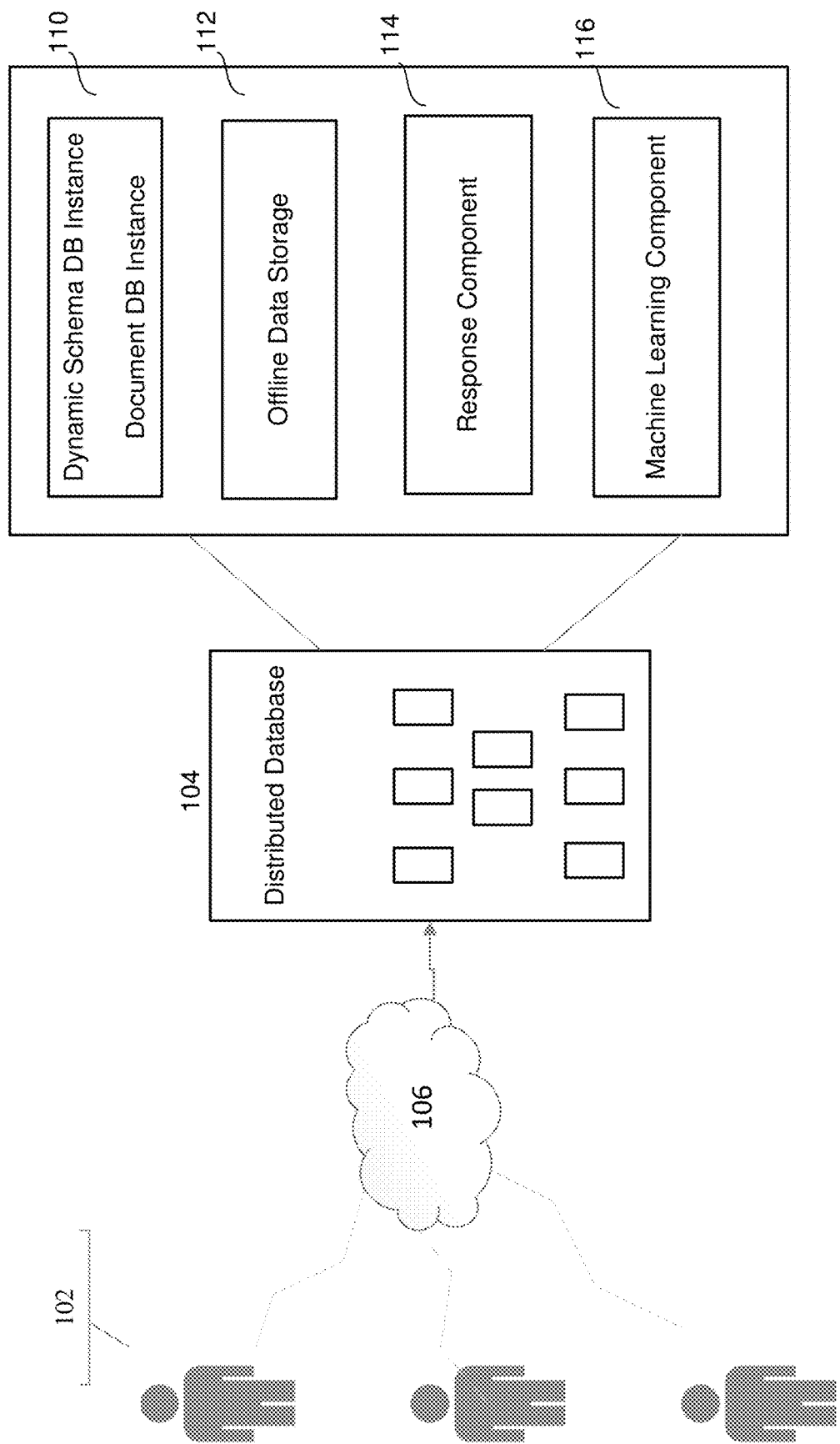
FIG. 1 is block diagram of an example system, according to one embodiment.

FIG. 1 is a block diagram of an example database system 100. Shown at 102, database clients and/or users can access a dynamic schema database 104 via a network 106. Users can submit queries that are executed by the database 104. In various embodiments, the database system can include a query engine configured to accept and process user queries and return data output via network 104. In some embodiments, the database 104 includes data under a dynamic or unstructured schema. Dynamic and/or unstructured databases do not enforce any data type limitations and can store structured and unstructured data. According to one embodiment, the known MongoDB database is an example of a dynamic and/or unstructured database. In MongoDB, data assets or base units of data are stored as BSON formatted documents. BSON are a binary serialization of java script object notation documents and store and transmit data objects consisting of attribute-value pairs, arrays (or other serializable values), and/or embedded documents.

For example, the database 104 can include a collection (e.g., a named logical grouping) of document data stored under a dynamic schema model at 110. The database 104 can also include other storage architectures and database instances (e.g., 112 offline storage or data lake storage). In various embodiments, the database includes a query engine 114 for processing any user queries and returning the results of the user queries. In some embodiments, the query engine is configured to execute an aggregation pipeline to process a user query on dynamic schema data. The known MongoDB database provides for aggregation operations that handle expressive queries efficiently on dynamic or unstructured data, as well as integrate with offline storage options. According to one embodiment, the database 104 can include an aggregation framework for processing queries according to a plurality of execution stages. MongoDB employs operators and execution of aggregations like $match, $unwind, $project, etc., to ensure efficient output from querying dynamic or unstructured data. Further embodiments introduce a $sql stage/aggregation operation to the aggregation framework to accept and interpret structured language queries to be executed on structured, dynamic, or unstructured data. In one example, the system and/or query engine 114 can include a mapping engine 116 configured to map incoming structured language queries into native operations that can leverage the full functionality of any underlying database implementation (e.g., MongoDB). In other embodiments, the mapping engine and/or query engine is configured to translate structured query statements into data environments and binding values that correspond to the structured queries. The definition of the operation's environment and corresponding binding values enables the query engine to accurately and consistently capture structured, non-structured and/or dynamic schema data without ambiguity or error.

In various embodiments, the query engine 114 and/or mapping engine 116 can be configured to identify structured query language query elements and manage their execution, for example, as part of a structured query language execution stage. In one example, the system is configured to accept queries from users who specify queries and/or portions of queries using specific query notation (e.g., $sql follow by query parameters). The query engine 114 and/or mapping engine can be configured to manage execution of the structured query language portion of the query and pass any output, to the user in response to the query or to another processing stage that employs the output of the prior stage for further processing. Similarly, the query engine 114 can be configured to execute other aggregation stages and pass their output to a $sql stage for further processing.

According to some embodiments, the query engine 114 and/or mapping engine 116 can be configured to process query functions in a $sql stage. The query engine 114 and/or mapping engine 116 can include processing rules and/or functions detailed in a query dialect configured to process structured query language, and may include mapping the structured query language into native expressive functions. In some embodiments, the mapping engine 116 can be called by the query engine as part of execution of an aggregation pipeline and/or stage. In other embodiments, the mapping engine can be a component or sub-component of the query engine, and in still others, the query engine can execute the functions described with respect to the mapping engine.

In some other embodiments, SQL queries can be defined and submitted by users for execution against dynamic schema databases, unstructured data, and/or structured data, and the query engine and/or the mapping engine can be configured to resolve the structured query even if no schema information is available. In further embodiments, the query and/or mapping engines translates SQL queries into environments and binding values on which the operation is to be performed. Examples of the translations, environments, and binding values are described in Appendix A. Appendix A illustrates example functionality implemented for a query dialect that executes SQL queries on non-relational database instances.

Example Query Dialect Implementation

Appendix A describes functions and features of example implementation and/or embodiment of a query dialect configured to process structured query language queries on non-relational data instances.

In various embodiments, the query dialect is implemented to not require a schema, include first-class support for polymorphic and structured data (e.g., not require transformation and leverage native functionality for such data types), have first-class support for BSON datatypes, use SQL-92 as a guideline for feature support. Further embodiments can include schema management operations configured to provide a way of creating a view or otherwise annotating a namespace with schema metadata, and provide backward compatible support for prior SQL integration.

Improvement Over Prior Implementation

Prior iterations of the known MongoDB database included some capability to process structured query language and return query results from non-relational database data. Prior iterations relied on defining a static schema for dynamic data. This approach yielded significant issues—one of the problems is that there is nothing that guarantees the static schemas employed are accurate. Unlike relational databases, which enforce a schema, schemas for a MongoDB collection are approximations. The implementation requires a variety of modifications intended to plug leaks in this abstraction, but the modifications were not always effective, and typically came at the cost of performance.

In prior versions, the database employed a flattening algorithm to deliver the static schema approximation. At a high level, the algorithm included the following behavior: Top-level scalar fields become columns; Subdocuments are recursively flattened until a scalar value is encountered, and the names of the keys at each subdocument are concatenated with a separator character; and Arrays are unwound into "child" tables that have a foreign-key relationship with the base table's _id field.

The inventors have realized that such a schema flattening algorithm does not work for every dataset. In fact, execution and experience teaches that it is not possible to have a single schema flattening algorithm that works for all datasets. In addition, the flattening algorithm sacrificed performance and created other issues. For example, column names generated by subdocument flattening and the table names generated for array tables may collide with existing field/table names. When this happens, the system was required to mangle the colliding names. For users with such collisions in their schema, it can become very difficult to determine the relationship between the SQL and MongoDB schemas.

According to other embodiments, the system is configured to guarantee that there are no runtime errors related to typing, unlike some conventional approaches, which can only sometimes statically catch type errors, and further has to either return an error or MISSING at runtime for any typing errors that cannot be caught statically. In further embodiments, the addition of schema information can enable an initially ambiguous query to compile successfully. In such circumstances, the system is configured to disambiguate and also not change the query semantics that compiled without schema information. Various conventional implementations simply do not provide this functionality.

In still other embodiments, the system enables SQL 92 Compatibility, which various conventional approaches do not have. For example, some conventional approaches incorrectly resolve unqualified identifiers when the identifier in question is the name of both an in-scope table and a column in an in-scope table.

Schema Sampling Examples

In some embodiments, the query dialect can employ schema definitions obtained from dynamic schema data. For example, the system can be configured to sample database collections and generate an approximation of the database schema. In one example, the schema approximation can be based on frequently appearing attribute values or other commonly occurring values obtained in the sample. In other embodiments, the database system can define a schema based on collection metadata and employ a read on an information_schema db generated from the metadata or wherever the system is configured to store schema approximation information.

Functionality Integration Examples

In various embodiments, the database system can manage DML and DDL. According to one embodiment, the system can be configured to accept DML/DDL on operations that are known to be consistent or mappable to dynamic schema operations. For example, a statement like INSERT INTO foo (a, b) VALUES (123, "bar") is mappable to operations in a dynamic schema database. However, a statement like INSERT INTO foo VALUES (123, "bar") has little to no meaning without a rigid schema—as the operation could behave inconsistently across a collection "foo." In some embodiments, the system forces a user to modify their query into an operation that is mappable to a consistent/native operation. Some embodiments can be configured to enforce a read only query operation for DML/DDL. Such operation ensures consistency but limits usability.

In further embodiments, there is also a subset of DML (e.g., INSERT into named columns, INSERT INTO . . . SELECT) that is supported. However, query generation can include validation operations to limit DML functionality, for example, to prevent operations (e.g., INSERT without explicitly named columns, default values) that are not readily mappable or that would require significant changes to the database server to implement the deeper level of schema support that would be required.

It should be appreciated that various examples above each describe functions that can be and have been incorporated in different system embodiments together. The examples and described functions are not exclusive and can be used together.

Structured Query Language & Integration Examples

Various embodiments provide for structured query language processing that invoke various syntax and query semantics of example dialects for managing execution (e.g., MongoSQL—a SQL dialect that is configured to provide first-class support for working with structured and schemaless data in dynamic schema databases (e.g., MongoDB), while remaining compatibility to the SQL 92 standard.

Various implementation, examples, and embodiments are described to illustrate functionality of the database system that includes structure query language support. The following description provides a model for describing the behavior of a query execution that invokes structured query language on a dynamic schema database and describes examples of any rewrites of the structured query language that occurs for execution. Further examples describe a "MongoSQL" implementation and/or "MongoSQL query" and describe definitions and notation that are used to illustrate various functions and to specify examples of the behavior of various language features. References to MongoSQL query are used to illustrate and to also describe more broadly the features that can be used in any dynamic, unstructured, and/or non-relational database that includes processing components to execute structured query language queries.

MongoSQL (sub-) and/or query and MongoSQL (sub-) and/or expression q can be evaluated within a catalog environment $\rho_c$, and values environment $\rho_n$, where n is a subscript used to denote different versions of $\rho$ during evaluation. The values environment, $\rho_n$, contains values which are in scope at a given point (temporally and syntactically) in a query execution, n. $\rho_c$ can be thought of as the catalog from most SQL databases. The initial $\rho_n$ at the start of execution is noted as $\rho_0$. In the description and in general, n need not be an integer; the subscript serves to illustrate a way to distinguish distinct environments during query execution.

In various embodiments, an environment is a binding tuple, which is a set $\langle (x_1,i_1): v_1, \ldots, (x_n,i_n): v_n \rangle$ where each $x_i$ is a valid BSON key or $\perp$, each $i_i$ is a subquery nesting depth, starting at 0 for the top-level query, and each $v_i$ is a BSON value. The shorthand $\langle X: v, \ldots \rangle$ is used in the following description and stands in for $\langle (X, 0): v, \ldots \rangle$.

In a top-level query, $\rho_0$ is set as the empty binding tuple because there are no local value bindings prior to query execution.

In further embodiments, the system defines a binding tuple concatenation as tupleConcat($d_0$, $d_1$). If the same key exists in both the first and the second binding tuple, the binding from the second tuple is preserved in the output tuple. If a key exists in only one of the tuples, it is preserved in the output tuple. Various examples reference the formal definition of tupleConcat described in greater detail below. In some embodiments, the system also defines he common set operators over arrays where the results are ordered in terms of the left argument.

Using MongoSQL as an example, each clause can be defined in isolation from the others. A clause is a function that inputs and outputs collections of binding tuples and the environments defined above. Formally, for P, the set of all possible environments (binding tuples), and C, the set of all possible arrays/collections of binding tuples, each clause is a function:

$$\text{Clause: } P \times C \rightarrow P \times C$$

As defined, the clause is a function accepting a tuple of ($\rho_i$, c), where each $\rho$ is a values environment as defined before, and each c is an array/collection of binding tuples. The global catalog environment, $\rho_c$, is accessible, and the global catalog is not modified as part of this process, so the system elides it from function inputs and outputs. Typically, clauses do not actually make changes to $\rho$, but instead create modified versions of $\rho$ for use in subqueries (as described below—a subquery is a SQL query within a query) or later clauses.

Various embodiment manage execution in manner similar to MongoDB's query language stages, which are functions over collections of BSON documents with one global environment containing the catalog and the state of certain global variables (e.g. $$NOW). The MongoSQL values environment $\rho_i$ is analogous to the set of fields defined by the current document or by let bindings in stages like $lookup.

As in standard SQL, the clauses of a MongoSQL query are evaluated in the following order: FROM; WHERE; GROUP BY; HAVING; SELECT; ORDER BY; OFFSET; and LIMIT. Consider the example shown in FIG. 4:

According to one embodiment, the query is executed as shown in FIG. 4, producing the specified inputs and outputs at each step. This example provides a basic introduction to the query semantics of SELECT (described in greater detail below), FROM (described in greater detail below), and WHERE (described in greater detail below) clauses.

In various embodiments, the FROM clause is evaluated within the environments $\rho_c$ and $\rho_0$ shown at the top of the example. After that, the FROM clause outputs the shown array of binding tuples, leaving the environments unchanged. In each binding tuple of $FROM_{out}$, the field names correspond to the aliases defined in the FROM clause, namely x and y. Because this is a cross join, the resulting binding tuples are formed from the cross product of test.foo and test.bar.

In some examples, there are no restrictions that the types of values bound to x and y be homogeneous, and fields can be missing, as the example shows. In further embodiments, the binding tuples themselves, however, are homogeneous: the same set of binding-tuple keys appear in every tuple from the same result set.

The clause following the FROM clause takes as its input an environment and an array of binding tuples and outputs an environment and an array of binding tuples (which then become the input to the next clause.

In the above example, the WHERE clause filters out those binding tuples where x.a is not greater than y.a by evaluating its condition for each binding tuple in the input array, and producing a new output array of binding tuples containing only those tuples that meet the condition.

Each conditional evaluation in the WHERE clause is performed within the environments $\rho_c$ and $\rho_i$=tupleConcat $(\rho_0, t_j)$. This means that the values from $\rho_0$ will be consistent while the values in $\rho_1$ that come from the current tuple $t_j$ will vary from tuple to tuple.

The value environment when the first input tuple is evaluated by the WHERE clause is:

$$\rho WHERE\ 1 = tupleConcat(\rho_0, d_0)$$
$$= tupleConcat(\langle\ \rangle, \langle (x, 0): \{a: 24.5\}, y:\{a: 41, b: 42\}\rangle)$$
$$= \langle (x, 0): \{a: 24.5\}, y: \{a: 41, b: 42\}\rangle$$

As shown, $\rho_{WHERE\ 1}$ is equivalent to the first input binding tuple, because $\rho_0$ for this query is empty. The WHERE condition evaluates to false for the first binding tuple in $WHERE_{in}$ because $(\rho_c, \rho_{WHERE\ 1}) \vdash x.a > y.a$ $\rightarrow \{a: 24.5\}.a > \{a: 41, b: 42\}.a$ $\rightarrow 24.5 > 41$ $\rightarrow$ false The last three binding tuples match the condition, and thus three binding tuples are sent to the SELECT clause:

$(\rho_c, \rho_{WHERE\ 2} = tupleConcat(\langle\ \rangle, \langle (x, 0): \{a: 24.5\}, y: \{a: 21, c: 23\}\rangle))$ $\vdash x.a > y.b$ $\rightarrow \{a: 24.5\}.a > \{a: 21, b: 23\}.a$ $\rightarrow 24.5 > 23$ $\rightarrow$ true $(\rho_c, \rho_{WHERE\ 3} = tupleConcat(\langle\ \rangle, \langle x, 0\rangle: \{a: 999, y: \{a: 41, b: 42\}\rangle))$ $\vdash x.hello > y.b$ $\rightarrow \{a: 999\}.a > \{a: 41, b: 42\}.a$ $\rightarrow 999 > 42$ $\rightarrow$ true $(\rho_c, \rho_{WHERE\ 4} = tupleConcat(\langle\ \rangle, \langle (x, 0): \{a: 999, y: \{a: 21, c: 23\}\rangle))$ $\vdash x.hello > y.b$ $\rightarrow \{a: 999\}.a > \{a: 21, b: 23\}.a$ $\rightarrow 999 > 23$ $\rightarrow$ true According to one embodiment, the pattern of "input an array (stream) of binding tuples, evaluate the constituent expressions, output an array (stream) of binding tuples" can include exceptions: for example, LIMIT and OFFSET do not need to actually evaluate any expressions for each binding tuple. Additionally, the FROM clause takes no input. For example, a LIMIT 10 clause that inputs an array or stream with 100 binding tuples need not access binding tuples 11-100. Overall, clauses of MongoSQL include an operator that inputs/outputs arrays (or streams) of binding tuples. As such, the system can define the query semantics of each clause separately from the semantics of the other clauses.

According to some embodiment, MongoDB's wire protocol is configured to process result sets of documents, not binding tuples. Therefore, the dialect can be configured to transform binding tuples result sets into BSON documents to leverage existing functionality (e.g., so that they can be returned in MongoDB result sets). Other embodiments permit bindings to different data structures (e.g. other document based data structures, among other options), as well as, partially structured and unstructured data.

There are many possible algorithms for rendering a binding tuple to a BSON document (among other formats), and MongoSQL does not require any particular one as part of the specification. The choice of rendering algorithm(s) can be made when implementing a database hosting the MongoSQL functionality. To provide an example, a default algorithm can be provided in various embodiments:

- Check each binding in the binding tuple
    - If keys exist with nesting depths other than 0, flag an error.
    - If the key's datasource name is ⊥:
        - The value for that key must be a document, and all the keys of that document
          will be materialized in the root of the target document
    - If the key's datasource name is a valid BSON key name:
        - If the value is a document:
            - If all keys of that document do not conflict with any keys of any other subdocuments or the root, materialize that document's bindings in the root of the target document

- If there are key conflicts, we materialize the document as a nested subdocument of the root materialized document with the binding tuple key as a BSON key
- If the value is not a document, materialize as a BSON key, value pair using the binding tuple key Examples:
⟨(a, 0): 1, (b, 0): 2⟩
materializes as
{a: 1, b: 2}
⟨(⊥, 0): {a: 1}, (b, 0): {a: 1, b: 2}⟩
materializes as
{a: 1, b: {a: 1, b: 2}}
Because b.a would conflict with a if rerooted.
⟨(⊥, 0): {a: 1}, (b, 0): {c: 1, b: 2}⟩
materializes as
{a: 1, c: 1, b: 2}
Because there are no conflicts introduced by rerooting b.

If the keys of documents in the generated binding tuples cannot be statically enumerated at query planning time, the system assumes that conflicts exist, meaning that the result will be materialized as a nested subdocument under the binding tuple key. In various embodiments, the system is configured to identify that if keys exist with nesting depths other than 0, flag an error because transforming a MongoSQL binding-tuple result set to a BSON-document result set is typically limited to occur at the root of a query. Thus the condition should not arise absent implementation error.

Figure 3:
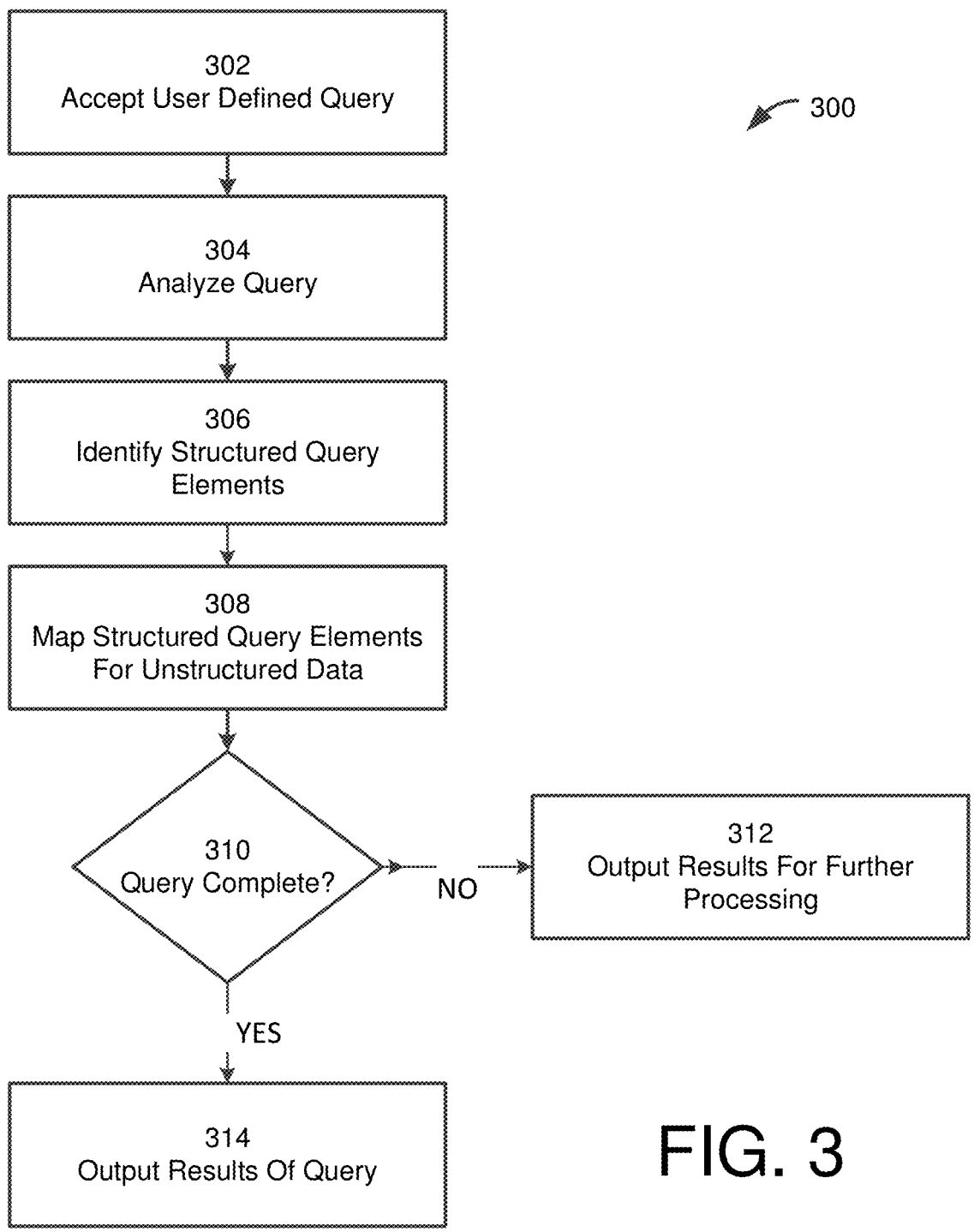
FIG. 3 is an example process for executing structured queries on unstructured databases.

FIG. 3 illustrates an example process 300 for processing structured queries against unstructured, partially structured, and dynamic schema database data. Process 300 begins at 302 with accepting a user defined query. The user defined query can be defined at any source seeking to retrieve information from various data repositories. User can include human users, systems, and applications, among other options. At 304, the accepted query is analyzed. Any structured query elements can be identified at 306, for example, in complex query structures. The structured query elements can be mapped to into data environments and binding values that correspond to the structured queries. The definition of the operation's environment and corresponding binding values enables the query engine to accurately and consistently capture structured, non-structured and/or dynamic schema data without ambiguity or error. In further embodiments, structured query elements can be executed as an execution stage for query processing. For example, query stages that do not require resolution of structured query elements can be processed to determine an output which is used as input to the structured query stage to produce a final output returned to the user query.

In further embodiments, the process 300 can include operations to generate and/or add schema information to structured query processing, which can enable an initially ambiguous query to compile successfully. In such circumstances, the system can be configured to disambiguate and also not change the semantics of a query that compiled without schema information. Further examples include definition of clauses that provide a function that inputs and outputs collections of binding tuples and respective environments (described in greater detail herein).

If the execution of the structured query elements completes the query 310 YES, process 300 continues with 314 and output the results of the completed query. If the execution of the structured query elements does not complete the query 310 NO, process 300 continues at 312 with output of the results of the structured query elements to use an input in further processing and/or processing stages.

Examples of MongoSQL Grammar

FIG. 5 and description provides examples of a linked grammar of for various embodiments of a MongoSQL syntax. Additional descriptions are provided herein for the example production that further explains the syntax and semantics of the given construct.

```
<MongoSQL statement> ::= <select query>
select query> ::= <set query>
    |           <select clause> <from clause>?
                <where clause>? <group by clause>?
                <having clause>? <order by clause>?
                <limit/offset clause>?
<limit/offset clause> ::= <limit clause> <offset clause>?
                | <offset clause> <limit clause>?
```

Example Type System Description: Example Data Types & Behavior

MongoSQL types are the set of BSON types available in the known BSON specification. These types can be queried in MongoSQL. In some embodiments, deprecated BSON types do not have literal syntax. The following example BSON types are supported in various embodiments: Double; String; Document; Array; BinData; ObjectId; Boolean; Date; Null; Regex; DBPointer; Javascript; Symbol; JavascriptWithScope; Int; Timestamp; Long; Decimal; MinKey; and MaxKey Other types and data formats can be supported including for example the known JSON format, among other options.

Example Type Names and Aliases

In some embodiments, each type in MongoSQL is assigned a name, a keyword that can be used to reference the type when necessary (e.g., in an expression like CAST). Some types have one or more aliases in addition to their primary name. Generally, MongoSQL types use their BSON type names and, for SQL-92 compatibility, their corresponding SQL-92 type names as aliases. For example, the MongoSQL Integer type uses the name INT from BSON and the aliases INTEGER and SMALLINT from SQL-92. Some embodiments define exceptions to the general approach. For example, in one embodiment, there are two exceptions: the BSON Date type and the BSON Timestamp type. The BSON Date type name conflicts with the SQL-92 Date type name. A BSON Date is a datetime, whereas a SQL-92 Date is just a date. The BSON Timestamp type name conflicts with the SQL-92 Timestamp type name. A BSON Timestamp is a special type for MongoDB, whereas a SQL-92 Timestamp is a datetime. Since MongoSQL is configured to be SQL-92 compliant, various embodiments use SQL-92 names whenever there is a precedence required. In further example, to address the naming conflicts, the MongoSQL Datetime type, which corresponds to the BSON Date type, uses the SQL-92 Timestamp type name, TIMESTAMP, and the MongoSQL Timestamp type, which corresponds to the BSON Timestamp type, uses the name BSON_TIME- STAMP. The MongoSQL Datetime type also uses the alias BSON_DATE. Type names and aliases are described in greater detail below In some embodiments, type aliases are rewritten to their core names in MongoSQL queries. Example type aliases and rewrites are shown in FIG. 6 and described in greater detail below.

According to some embodiments, the INTERVAL type is not supported by MongoSQL, as there are different levels of SQL-92 support and INTERVAL is not part of SQL-92 ENTRY support. In other embodiments, INTERVAL can be defined as part of the grammar. Various options are available to resolve the name conflicts (e.g., between the BSON Timestamp and SQL-92 Timestamp types, and the BSON Date and SQL-92 Date types, etc). In some embodiments, the system defines names with a prefix to identify the MongoSQL names for the BSON types with "BSON_". For consistency across all BSON types, other embodiments use aliases for all BSON types that include the "BSON_" prefix. Other embodiments, limit the use of the BSON prefix to cases where an actual conflict exists to (1) avoid clutter, and (2) maintaining consistency across alias names for all BSON types can actually lead to more user confusion as opposed to reducing user confusion.

Example Type Conversion and Behavioral Description

According to one embodiment, type conversions fall into two categories: explicit and implicit. Explicit type conversions are directly invoked by users. Implicit type conversions are performed without users specifically requesting them. In MongoSQL, type conversions can be explicit. Some embodiments limit functionality to explicit conversions only.

Explicit type conversions are expressed via the CAST scalar function (described in greater detail in the scalar function section below) or with the :: operator described in greater detail in the operator section below). The CAST function accepts multiple arguments (including for example, up to four arguments). As defined by SQL-92, the base-level invocation of CAST accepts an operand to cast and a target data type. In addition to that form, various embodiments that include MongoSQL can be configured to accept two additional, optional arguments. One additional argument is an expression to return if the operand is NULL or MISSING; if omitted, casting NULL or MISSING to anything results in NULL. The other additional argument is an expression to return if the conversion produces a runtime error; if omitted, MongoSQL will return NULL if it encounters a casting error. The grammar section below provides examples and details on these extra arguments.

The :: operator is a shorthand alias for the two-argument form of the CAST function.
<expr>::<type>
Rewritten as:
CAST(<expr> AS <type>)

In addition to CAST and ::, implementations may also define "constructor" scalar functions that alias CAST invocations to certain types. For example, an implementation may define an OBJECTID(<expression>) function as shorthand for CAST(<expression> AS OBJECTID).

Although type conversions can be made explicit, that does not mean type conversions are required in all circumstances. Numeric types are all mutually comparable. Therefore, MongoSQL allows operations between the various numeric types without casting the operands to be the same numeric type. For example, an int can be added to a double, or a long could be compared to a decimal, etc.

Example Conversion Behavior

According to some embodiments, the range of target types is a subset of all MongoSQL types. Valid target types are ARRAY, DOCUMENT, DOUBLE, STRING, OBJECTID, OOL, BSON_DATE, INT, LONG, and DECIMAL, or any of their corresponding SQL-92 type aliases as described in the data types above. If the provided target type is invalid, a static error can be returned.

According to further embodiments, for target types except ARRAY and DOCUMENT, MongoSQL type conversion behaves the same as $convert. Example exceptions to this is that MongoSQL CAST returns NULL instead of throwing a runtime error if a conversion error is encountered and no ON ERROR argument is provided. Attempting to CAST to a target type from an incompatible source type, for example BOOL to BSON_DATE, is considered a conversion error and evaluates to ON ERROR or NULL if that is not provided.

Casting to ARRAY behaves as follows:

| Input | Behavior |
| --- | --- |
| ARRAY | No-op |
| NULL | ON NULL expression, if provided |
| MISSING | NULL otherwise |
| Any other type | ON ERROR expression, if provided NULL otherwise |

Casting to DOCUMENT behaves as follows:

| Input | Behavior |
| --- | --- |
| DOCUMENT | No-op |
| NULL | ON NULL expression, if provided |
| MISSING | NULL otherwise |
| Any other type | ON ERROR expression, if provided NULL otherwise |

Example Grammar

```
<cast expression> ::= <expression> "::" <type>
  | CAST "(" <expression> AS <type>
    ("," <expression> ON NULL)?
    ("," <expression> ON ERROR)?
    ")"
```

In some embodiments, SQL-92 specifies that implicit casting is only required within groups of similar types, i.e. numeric types, character types, bit types, datetime types, and interval types, not between them.

In some embodiments, MongoSQL does not use implicit type conversions between different groups of types. For example, <int>+<string> uses an explicit cast from <string> to a numeric type. Other embodiments of MongoSQL do support operations between different numeric types, but this is transparent to users. While Implicit conversions can lead to confusing query semantics and potentially unexpected and surprising behavior, some implementations include implicit conversions.

Example Schema/Type Constraints

A schema in MongoSQL is a collection of facts about an expression or collection that are known to be true at compile time. MongoSQL schemas are similar to a structural type systems where the description references "schema" instead of "type" to avoid confusion with defined data types. For example, a MongoSQL schema might tell us that "this expression is either a boolean or a document with subfields a and b", or "this expression is either an array of length 1 or a positive integer".

Example Schema Inference

According to one embodiment, MongoSQL is configured to get schema information from a number of different places when it is available:

The database that is hosting a MongoSQL implementation can provide schema information about some or all collections.

The types of all other MongoSQL expressions (literals, operators, scalar functions, etc) can be determined at compile time. For example, the system can know at compile time that "abc" is a string, and that CASE WHEN x THEN 5 ELSE false END is either an integer or a boolean.

According to one embodiment, if schema information is not available from the host database, MongoSQL assigns static types to all expressions (including column references); these types are much less constrained than otherwise—if schema data were available. For example, when no schema data is available for the collection foo, the field a in the query SELECT a FROM foo could be a value of any MongoSQL type, or could be missing.

Example Type Checking

In some embodiments, there are numerous situations where an expression's type can be verified at compile time. System functions and associated operators have constraints on the types of respective arguments, and some clauses also have type constraints for expressions in certain positions. Some expressions that would typically check types at runtime (x IS INTEGER, for example) may also be evaluated at compile time by the system where sufficient type information is available. For example, if a static type constraint is not satisfied, then the query will fail to compile.

Example Type Assertion

In order to match the type constraint mentioned above, the system can be configured to ensure users add CAST on expressions to declare its type in the schema-less mode. To simplify this process and reduce the unnecessary conversion stage created during translation, the system enables a type assertion operator ::!, with which the expression is statically treated as the type appended to the operator. In some embodiments, the system is configured to limit/prevent any conversion applied on the result of this expression, for example, during evaluation.

According to one embodiment, when the type assertion operator is applied on the expression with determined types, a static check is performed to make sure that the target type is among those types. If not, a static error will be thrown. For example, given schema 'foo': {
 'bsonType': "int"
},
foo::!STRING will fail the static check because STRING is not part of the possible types foo contains.
Given schema
'foo': {
 'anyOf': [
  { 'bsonType': "int" },
  { 'bsonType': "string" }
 ]
}
foo::!STRING will pass the static check and be treated as string type in the query.

The system can advise uses that if the column reference contains a type that does not work under the expression, even if it can pass the static check, a runtime error will be returned when the query is executed. For example, substr(foo::!STRING, 1, 2) throws a runtime error if foo is not actually a STRING type because substr only accepts a STRING or NULL value. Example Grammar <type assertion>::=<expression>::!<type>

According to some embodiments, there is no additional syntax associated with schema/type constraints. Other embodiments can provide a MongoSQL implementation with an API for getting type information about things such as collections, result sets, or expressions. In some embodiments, the system can provide such type information. For example, the system can provide query advice, query validation, query suggestions, and/or supply type information for specific query, query targets, data environments, etc.

Example Processing of Clauses: Example Select Clause

According to some embodiments, the main form of the <select clause> is SELECT VALUES. Other formats of <select clause> are modifications of the main form that can be syntactically rewritten to an equivalent SELECT VALUES query.

According to various embodiments, MongoSQL allows SELECT VALUE and SELECT VALUES to be used interchangeably. Both are supported to allow for a more natural-reading query in the presence of single or multiple expressions. MongoSQL will rewrite the keyword to match the number of arguments, as shown in the following examples:

SELECT VALUE a.*, b.* FROM a JOIN b
rewrite to
SELECT VALUES a.*, b.* FROM a JOIN b
SELECT VALUES {'a': 1} FROM foo
rewrite to
SELECT VALUE {'a': 1} FROM foo For example, SELECT VALUE(S) accepts a list of <select value expr>, and for example evaluates as: an ordinary expression that resolves to a document or a sub-star expression. If an expression provided to SELECT VALUE is not a sub-star expression and cannot be statically determined to be a document, then the system is configured to return a static error. In another example, SELECT VALUE constructs one output binding tuple for each tuple in the $SELECT_{in}$ stream. Typically, each output binding tuple has one binding per <select value expr>. If the <select value expr> is a document expression, then the binding's key is ⊥ and its value is the result of evaluating the document in the local values environment ρ. If the <select value expr> is a sub-star expression, then the binding's key is the identifier preceding the star, and the value is the root value from the datasource referenced by that identifier.

Consider the following query to highlight functionality that demonstrates how document expressions are handled in some examples:

SELECT VALUE {a: y.a, b: y.c} FROM [{a: 1, c: 2}, {a: 3}] AS y

According to some embodiments, since the SELECT query is a top-level query (not a correlated subquery), the initial values environment is empty (i.e. $ρ_0=\{\}$). For each input tuple, the system is configured to create the local values environment by concatenating $ρ_0$ with the tuple. In the example above, the document expression will be evaluated twice; first in the environment:

$$\rho_{row1} = tupleConcat(\rho_0, \langle y: \{a: 1, c: 2\}\rangle)$$

$$= tupleConcat(\langle\ \rangle, \langle y:\{a: 1, c: 2\}\rangle)$$

$$= \langle y: \{a: 1, c: 2\}\rangle$$

And then (for the second input tuple) in the environment $$\rho_{row2} = tupleConcat(\rho_0, \langle y: \{a: 3\}\rangle)$$

$$= tupleConcat(\langle\ \rangle, \langle y: \{a: 3\}\rangle)$$

$$= \langle y: \{a: 3\}\rangle$$

According to one embodiment, the system can be configured to create one binding tuple per input binding tuple, each mapping the ⊥ key to the value of the document expression. For the example query above, the output stream is:

$$SELECT_{out} = [\langle \bot : \rho_{row1} \vdash\ < document\ expression >\rangle,$$

$$\langle \bot : \rho_{row2} \vdash\ < document\ expression >\rangle]$$

$$= [\langle \bot : \rho_{row1} \vdash \{a : y.a, b : y.c\}\rangle,$$

$$\langle \bot : \rho_{row2} \vdash \{a: y.a, b: y.c\}\rangle]$$

$$= [\langle \bot : \langle y: \{a: 1, c: 2\}\rangle \vdash \{a: y.a, b: y.c\}\rangle,$$

$$\langle \bot : \langle y\{a: 3\}\rangle \vdash \{a: y.a, b: y.c\}\rangle]$$

$$= [\langle \bot : \{a: 1, b: 2\}\rangle,$$

$$\langle \bot : \{a: 3\}\rangle]$$

Next, consider a query that demonstrates how sub-star expressions are handled: SELECT VALUE y.* FROM [{a: 1, c: 2}, {a: 3}] AS y As in the previous example, the sub-star expression is evaluated twice; first in the environment:
$\rho_{row1} = \langle y: \{a: 1, c: 2\}\rangle$
And then (for the second input tuple) in the environment
$\rho_{row2} = \langle (y: \{a: 3\}\rangle$
Which gives the system the output stream $$SELECT_{out} = [\langle y: getReference(\rho_{row1}, y)\rangle,$$

$$\langle y: getReference(\rho_{row2}, y)\rangle]$$

$$= [\langle y: getReference(\langle y: \{a: 1, c: 2\}\rangle, y)\rangle,$$

$$\langle y: getReference(\langle y: \{a: 3\}\rangle, y)\rangle]$$

$$= [\langle y: \{a: 1, c: 2\}\rangle,$$

$$\langle y: \{a: 3\}\rangle]$$

FIG. 7 illustrates examples of the rewriting functions and example Grammar.

From Clause Example Behavior Description

According to some embodiments, FROM is the first clause of every MongoSQL query to be evaluated. This makes it a special case, because it does not take a binding-tuple stream as its input. Instead, it generates its output tuple stream from various datasources. The various MongoSQL examples include at least four kinds of datasources: collection, array, join, and derived table (each described in greater detail below). Datasources provide various ways of creating streams of binding tuples. Simple datasources create streams of tuples with a single key, while compound datasources create streams of tuples with multiple keys. In one embodiment, the top-level datasource in a FROM clause forms the clause's output stream.

Example Grammar

```
<from clause> ::= FROM <datasource>
<datasource> ::= <simple datasource> | <compound datasource>
<compound datasource> ::= <join datasource>
<simple datasource> ::= <collection datasource>
  | <array datasource>
  | <derived table datasource>
<array datasource> ::= <array expression> <alias>
<derived table datasource> ::= "(" <select query> ")" <alias>
<collection datasource> ::= <collection reference> <alias>?
<collection reference> ::= <compound identifier>
```

Collection Datasources Example

According to one embodiment, a collection datasource is composed of a collection reference (qualified or unqualified) and an optional alias. Formally, the collection reference is resolved in the catalog environment using the getReference function defined above. Informally, qualified references are treated as <db>.<collection> pairs, while unqualified references are treated as collections in the current database.

According to some embodiments, collection datasources without an explicit alias are syntactically rewritten to have an alias. For unqualified identifiers, the whole identifier is used as the alias. For qualified identifiers, the collection part is used as the alias.

In one example, the system uses a collection datasource to create a stream of binding tuples with a single key-value pair. One binding tuple is created per document in the referenced collection. The key of each tuple is the alias name, and the value is the root document.

For example, consider the output of the collection datasource in the following query:
SELECT * FROM collection AS alias
$SELECT_{out} = FROM_{out} = [\langle alias: d\rangle\ for\ d \in collection]$ Resolving Array Datasources Example According to one embodiment, an array datasource is composed of an array literal and an alias. The array's elements statically evaluate to document values; syntactically, expressions are permitted inside the array, as long as they can be evaluated at compile time. In various embodiments, the system processes an array datasource and creates a stream of binding tuples with a single key-value pair. One binding tuple is created per value in the array. The key of each tuple is the alias name, and the value is the array element.

For example, consider the output of the array datasource in the following query:
SELECT * FROM [{'a': 1}, {'a': 2}] AS alias
$SELECT_{out} = FROM_{out} = [\langle alias:\ \{'a':\ 1\}\rangle,\ \langle alias:\ \{'a':\ 2\}\rangle]$ Join Datasources Example According to one embodiment, a join datasource is a compound datasource that combines two other datasources. In one example, the binding tuples created by the join contain the keys from the two combined datasources. The system is configured to generate the sets of datasource names created by each side of the join as disjoint sets. For example, if the same datasource name appears on both sides of a join, the query will fail to compile. The number and contents of the tuples output by a join datasource depends on the type of join and the join criteria. Behavior for each join type is described below. MongoSQL supports INNER JOIN, (CROSS) JOIN, LEFT OUTER JOIN, and RIGHT OUTER JOIN.

Rewrites Examples

According to some embodiments, there are two types of JOIN that may be rewritten syntactically. The system can also be configured to rewrite values to have aliases as specified above in the description of the collection datasources.

Comma Join Example

<datasource>, <datasource> is rewritten as:

<datasource> CROSS JOIN <datasource>

Example Semantics for CROSS JOIN

According to one embodiment, CROSS JOIN performs a mathematical cross product of two datasources. For example, consider the output of the join datasource in the following query:

SELECT * FROM A AS a1 CROSS JOIN B AS b1

$SELECT_{out} = FROM_{out} = [\langle a1: a, b1: b \rangle \text{ for } (a, b) \in A \times B]$ Example Semantics for INNER JOIN According to one embodiment, semantically, an INNER JOIN is equivalent to a CROSS JOIN filtered by a WHERE clause. For example:

SELECT * FROM X INNER JOIN Y ON <condition> is equivalent to

SELECT * FROM X CROSS JOIN Y WHERE <condition>

In some embodiments, the same predicate typing restrictions apply when using ON as when using WHERE. The difference between an inner join's ON predicate and a WHERE clause is that the values in scope for the ON predicate are those in the two datasources being joined. For example, consider the output of the join datasource example below. For the purpose of the formal definition, the systems executes the join criteria <condition> as a function that takes a binding tuple and returns a boolean.

SELECT * FROM A as a1 INNER JOIN B as b1 ON <condition>

$SELECT_{out} = FROM_{out} = [\text{tup if } <condition>(tup)$ where tup=$\langle a1: a, b1: b \rangle$ for $(a, b) \in A \times B]$ Some embodiments, rely on Join ON and JOIN WHERE functionality and do not support JOIN USING. Other embodiments can enable JOIN USING.

Example Semantics for LEFT OUTER JOIN

Like in standard SQL, left outer joins in MongoSQL guarantee that every tuple from the left side of the join appears at least once in the result. The main way in which MongoSQL differs from standard SQL is that the system cannot necessarily enumerate all field names in a datasource. So, in the cases where SQL would return null values for all fields on the right side of a join, various embodiments are configured to set the value for all right-side datasource names to the empty document or NULL.

SELECT * FROM A AS a1 LEFT OUTER JOIN B AS b1 ON <condition>

$SELECT_{out} = FROM_{out} = [ \ldots, \langle a1: \{ \ldots \}, b1: \{ \ldots \} \rangle,$ $\langle a1: \{ \ldots \}, b1: \{ \} \rangle, \ldots ]$ Example Semantics for RIGHT OUTER JOIN A right outer join is the inverse of a left outer join. According to various embodiments, the MongoSQL implementation does not provide guarantees about field order, thus the following queries are semantically equivalent:

SELECT * FROM A AS a1 LEFT OUTER JOIN B AS b1 ON <condition>

SELECT * FROM B AS b1 RIGHT OUTER JOIN A AS a1 ON <condition>

Example Grammar

```
<join datasource> ::=
    <cross join>
    | <datasource>(, <datasource>)+
    | <qualified join>
    | "(" <join datasource> ")"
<cross join> ::=
    <datasource> CROSS? JOIN <datasource>
<qualified join> ::=
    <datasource> <join type> JOIN <datasource> <join spec>?
<join spec> ::=
    ON <expression>
```

According to various embodiments, the expression field can include the operations described in greater detail below, for example with heading <expression>.

```
<join column list> ::= <compound identifier>
    ("," <compound identifier>)*
```

Various example implementation for <compound identifier> are described in greater detail below.

```
<join type> ::=
    INNER
    | LEFT OUTER?
    | RIGHT OUTER?
```

According to some embodiments, MongoSQL Dialect does not enable "Natural Join" operation. Other embodiments can enable the functionality and also provide notifications on default behavior. For example, if tables foo and bar both have a field baz of type document, the equality condition of the join is set to be on baz (and the notification provides this information), in another example, the equality condition of the join is set to be on the shared subfields of baz (and the notification provides this information).

Derived Table Datasources Example

According to one embodiment, a derived table datasource is made up of a parenthesized MongoSQL query and an alias. Note, unlike a subquery expression, a derived table datasource does not have correlated fields from outer queries.

In one example, a derived table datasource creates a stream of binding tuples as defined by the query semantics for the SELECT clause of the derived table datasource query. One new binding tuple is created per binding tuple returned by the SELECT clause of the derived table query. The key of each tuple is defined by the system as the alias name, and the value is the result of merging the values of all bindings in the corresponding input tuple. For example, consider the output of the derived table datasource in the following query:

```
SELECT * FROM (
    SELECT * FROM [{'a': 1}] AS arr1
    CROSS JOIN [{'b': 2}, {'b': 3}] AS arr2
) AS derived
```

```
      SELECT_out = FROM_out = [
          ⟨derived: {'a': 1, 'b': 2}⟩,
          ⟨derived: {'a': 1, 'b': 3}⟩
      ]
```

The query semantics for derived tables for FROM (q) AS x are thus:

FROM$_{out}$=[⟨ x: $mergeObjects($v_0$, . . . , $v_n$)⟩
   where d=⟨$y_0$: $v_0$, . . . , $y_n$: $v_n$⟩
   for d∈q]

where $mergeObjects is a native MongoDB query language function, which has semantics similar to tupleConcat, but applied to documents rather than binding tuples.

Ambiguous Bindings Examples

In some embodiments, the system can be configured to disallow ambiguous queries with a static error (e.g., unless the system can determine statically that there are no duplicate top-level keys in the documents to be merged). If the keys of documents in the subquery's output binding tuples cannot be statically enumerated at query planning time (in the case of a SELECT *, for example), the system determines that a conflict exists and is configured to raise a static error:

```
      SELECT * FROM (
          SELECT * FROM foo AS foo
          CROSS JOIN bar AS bar
      ) AS derived
```

Results in an error:

The system can notify the end user of the error as follows: The keys of datasources 'foo', 'bar' are not enumerable, and may be ambiguous. Try replacing 'SELECT *' with direct references, or providing schemata for 'foo', 'bar'.

According to various embodiments, the system is configured to identify and report ambiguity as an error as early as possible (e.g., at the point of the derived table query rather than at the uses of those derived values). This implementation provides improved operations and a straightforward implementation, which improves feedback to users (e.g., immediate feedback) who may be writing queries that take hours or days to execute. Thus, any feedback that is provided pre-execution can save days of computation time relative to conventional implementation (e.g., MYSQL, Postgres, SQLLite, PartiQL, Presto, etc.). Additionally, duplicate keys can be identified as undefined behavior. For example, within a MongoDB database implementation duplicate keys are undefined behavior and return an error upon identification by the system. Other systems provide options to use duplicate keys thus failing to provide options to identify them as a source of ambiguity until execution.

Example Implementation of WHERE Clause & Example Behavioral Description

According to various embodiments, a WHERE clause is a filter on the incoming binding tuples. The output binding tuples are those binding tuples for which the condition is met.

Formally, for WHERE e
  error if e(x) IS NOT {BOOLEAN, NULL, MISSING} (statically)
  otherwise
  WHERE$_{out}$ = [
    x if e(x)
    for x ∈ WHERE$_{IN}$
  ]

According to some embodiments, the system is configured to report an error if e(x) is not statically guaranteed to be a BOOLEAN. The expression, e, must statically return a boolean, for example, either by using a CAST to BOOLEAN, or by using only expressions that are guaranteed to return BOOLEAN, such as comparison operators, AND, and OR, or a CASE statically determined to always return BOOLEAN. In some examples, NULL (and MISSING) being distinct from TRUE, cause the system to not include the current document, x, in the result set. Various embodiments are configured to provide this behavior consistent with major implementation of SQL.

In further embodiments, array matching semantics are identified as an operation that is not supported. Some embodiments, include functionality for processing arrays but limit operations to ensure consistent functionality. Still other embodiment define behavior and provide notifications to users to educate on the defined behavior associated with array matching semantics.

Example Grammar
  <where clause>::=WHERE <expression>

Some conventional approaches of SQL are configured to automatically coerce WHERE arguments to BOOLEANs. Thus, there is no attempt to identify ambiguity until run time. Some, like MySQL, do not even have a BOOLEAN type. The behavior of requiring the expression to be a BOOLEAN is consistent with conventional implementation (e.g., Postgres and PartiQL). While PartiQL makes this determination dynamically, various embodiments improve over such operation by statically ensuring the argument is a BOOLEAN (or NULL/MISSING) in processing. Such embodiments are configured to avoid having queries fail during execution due to polymorphic data. For example, various embodiments of the system are configured to avoid this result as analytic queries can often take hours to run and such failure represents large computational waste.

Example Operation of GROUP BY Clause & Example Behavioral Description

According to some embodiments, the system defines a GROUP BY that provides a means for grouping data into equivalence classes. For example, Aggregations can then be done on these equivalence classes. According to one embodiment, the main form of GROUP BY is as follows:

GROUP BY $e_1$ AS $x_1$, . . . , $e_m$ AS $x_m$ AGGREGATE agg_function(e) AS $y_1$, . . . agg_function'(e') AS $y_n$ For example, the expressions $e_1$ . . . $e_m$, when taken as an array, provide the equivalence class key. For each array value achieved by evaluating these expressions on a document, a separate group is formed. Unless it is a column reference, each element of the equivalence class key must have an alias for reuse purposes after the GROUP stage. Aliases are automatically generated where needed using the alias rules—for example, described in greater detail below—see e.g., the description of Rewrites for Generation of GROUP Aliases.

According to one embodiment, the output of the clause contains one binding tuple per unique value of the equivalence class key with the values of the group equivalence class key and the results of the aggregation functions named as mentioned. The system is configured to address top-level MISSING values by converting to NULL in GROUP BY expressions, as in all arrays. GROUP keys use the semantics of MongoSQL=, except that all NULLs are considered equivalent. In some embodiments, this means that the double 3.0 and the integer 3 are grouped into the same group. The system is configured to handle this property. In some embodiments, GROUP keys are statically proved to be comparable to each other via equality by the system. For example, when multiple numeric types are grouped into one group, the type in the output group chosen is undefined behavior and implementation specific. In some examples, the underlying database implementation can dictate elements of the behavior (e.g., mongod 4.2 chooses the first type seen during grouping). In various examples, the arguments to agg_function can be any expression.

Example Implementation of ALL and DISTINCT agg_functions

In one embodiment, ALL does nothing in agg_functions as that is the default behavior. In one example, it is removed during syntactic rewrite. Thus:
   agg_function(ALL e)
   will be rewritten as:
   agg_function(e)

In further embodiments, DISTINCT agg_functions are executed by the system to only consider distinct elements of the groups over which they are aggregating. In one example, Distinctness is defined (e.g., using the MongoSQL equality operator), except that NULL is considered equivalent to NULL, and MISSING can be converted to NULL. In some embodiments, arguments to DISTINCT agg_functions are statically proved by the system to be comparable to each other via equality. In some embodiments, the system can be configured to require that the type match here as well. In one example, the system executes a cast in a subquery. This implementation can prevent some edge case issues as well.

Example Implementation GROUP BY Clause Output

According to one embodiment, the GROUP BY clause, outputs a stream of binding tuples. As described above, the output stream contains one tuple for each group key equivalence class. For example, the binding tuples contain the group keys and aggregates defined in the GROUP BY clause.

To illustrate example functionality, the following example query and the output tuples generated by its GROUP clause are shown. In this example, all group keys are aliased, so every field is nested under the ⊥ datasource name in the output tuples:
   SELECT * FROM foo GROUP BY foo.a AS key AGGREGATE sum(a) AS sum;
   SELECT$_{in}$=GROUP$_{out}$=[⟨⊥: {key: <value>, sum: <value>}⟩, ... ]

If there is one or more unaliased group keys, those keys are nested under their original namespaces in the binding tuple:
   SELECT * FROM foo GROUP BY a AGGREGATE sum(a) AS sum;
   SELECT$_{out}$=GROUP$_{out}$=[⟨⊥: {sum: <value>}, foo: {a: <value>}⟩, ... ]

Example Rewrite Implicit GROUP BY to Explicit GROUP BY NULL

According to one embodiment, using an aggregate function in the select clause creates an implicit GROUP BY where only one group is created. The explicit GROUP BY the system is configured to rewrite this to use NULL as the group key, though in other examples, grouping by any constant value is equivalent.

SELECT ... , ... agg_function(x) ... AS y, ... FROM <from item>
rewrite as:
SELECT ... , ... agg_function(x) ... AS y, ... FROM <from item> GROUP BY NULL
Rewrite SELECT clause aggregate functions into AGGREGATE clause
SELECT ... , ... agg_function(e) ... , ... FROM <from item> GROUP BY ... AGGREGATE ....
rewrite as:
SELECT ... , ... _aggN ... , ... FROM <from item> GROUP BY ... AGGREGATE agg_function(e) AS _aggN, ....

According to one embodiment, duplicated aggregate function expressions, e.g., SUM(x+1) and SUM(x+1) are configured to have one computation in the AGGREGATE section for efficiency reasons. For example, the same alias can be used in each position.

Example Operation: Rewrite HAVING Clause Aggregate Functions into AGGREGATE Clause
   GROUP BY ... HAVING ... agg_function(e) ....
Rewrite as:
   GROUP BY ... AGGREGATE agg_function(e) AS _aggn HAVING ... _aggn ....

As above, duplicated aggregation function expressions are rewritten by the system to occur once in the AGGREGATE phrase of the clause.

Example Operation: Rewrite for Generation of GROUP Aliases

When the expressions $e_1 \ldots e_{n+m}$ are non-reference expressions
   GROUP BY $e_1, \ldots, e_n$ AGGREGATE $e_{n+1}, \ldots, e_{n+m}$
   rewrite as:
   GROUP BY $e_1$ AS _groupKey1, ..., $e_n$ AS _groupKeyn
   AGGREGATE $e_{n+1}$ AS _agg1, ..., $e_{n+m}$ AS _aggm According to some embodiments, when an expression in $e_1 \ldots e_n$ is a reference to a top-level field, the system is configured to not generate an alias for the field, so that it can be referenced by its fully qualified name in subsequent clauses. Given instances of constrained behavior, for example, where the system cannot distinguish between top-level field references and subpaths during syntactic rewrites, various embodiments are configured to skip generating an alias for any GROUP BY key that might resemble a top-level field.

When both SELECT and HAVING contain agg_function expressions, the SELECT agg_function expressions are added to AGGREGATE first, followed by HAVING. If there is duplication of agg_function expressions, the position is determined by the first instance of the duplicated agg_function expression. For example:

```
SELECT SUM(x), COUNT(y)
FROM foo
GROUP BY z
HAVING COUNT(y) + SUM(x) + SUM(y) > 20
``` rewrite as:

```
SELECT VALUE {'_1': ', _agg1, '_2': _agg2}
FROM foo AS foo
GROUP BY z AS z
AGGREGATE SUM(x) AS _agg1, COUNT(y) AS _agg2, SUM(y) AS _agg3
HAVING _agg2 + _agg1 + _agg3 > 20
```

Example Operation: Aggregation Functions

According to various embodiments, the following are the aggregation functions supported by MongoSQL dialect. For example, each one is evaluated on all of the specified elements from each value in a group as determined by the group key value.

ADD_TO_ARRAY—Pushes the argument to the end of an array, the total output of this function is an array.
The type of the argument to ADD_TO_ARRAY does not matter for execution.

ADD_TO_SET—Pushes the argument to the end of an array removing duplicates, the total output of this function is an array with all duplicate items removed. Duplicates are determined using an "=" operator. In another example, ADD_TO_SET(x) is equivalent to ADD_TO_ARRAY(DISTINCT x), and maintained for compatibility with underlying native query languages.
The type of the argument to ADD_TO_SET does not matter.

AVG—Takes the average of all the arguments.
The argument is statically typed to a numeric type by the system.

COUNT—Counts the number of elements. COUNT(*) counts all values unconditionally, COUNT(<expression>) counts all values for which the expression does not result in NULL or MISSING.
The type of the argument to COUNT does not matter in various embodiments.

FIRST—Returns the first element in the group. Operation is deterministic when the input has deterministic order, otherwise undefined.
The type of the argument to FIRST does not matter.

LAST—Returns the first element in the group. Operation is deterministic when the input has deterministic order, otherwise undefined.
The type of the argument to LAST does not matter.

MAX—Returns the max element as ordered by the MongoSQL >operator.
The system is configured to statically type the argument to be comparable via the >operator.

MERGE_DOCUMENTS—Returns a document formed by successively merging documents, with the previous element used as the left hand side. In the case of duplicate keys, the value of the key in the new element is kept.
The argument must be statically typed as DOCUMENT, and thus MERGE_DOCUMENTS(DISTINCT x) is not allowed at this time. As with FIRST and LAST, the output is only deterministic when the input has deterministic ordering.

MIN—Returns the min element as ordered by the MongoSQL <operator.
The argument must be statically typed to be comparable via the <operator.

STDDEV_POP—Returns the standard deviation of all elements over the entire group population.
In one example, the system is configured to statically type the argument to a numeric type.

STDDEV_SAMP—Returns the standard deviation of a sample of all elements in the group.
In one example, the system is configured to statically type the argument to a numeric type.

SUM—Takes the sum of all the arguments.
In one example, the system is configured to statically type the argument to a numeric type.

Example Operation: HAVING Clause

According to one embodiment, the HAVING clause operates the same as a WHERE clause, but after the GROUP BY clause, meaning it can reference aliases defined in the GROUP BY and can contain expressions with agg_functions; and in some examples, aliases defined in the GROUP BY are available to the HAVING clause. According to one embodiment, the system enables this operation for filters that need the values computed by the GROUP BY, as the WHERE clause is applied before GROUP BY. Just as a WHERE clause, the HAVING clause takes an expression that system evaluates statically to have a type BOOL or NULL and may evaluate to MISSING. HAVING agg_function applications are rewritten as follows:

GROUP BY . . . AGGREGATE . . . HAVING . . . agg_function(e) . . . .

rewrite as:

GROUP BY . . . AGGREGATE . . . agg_function(e) AS_n . . . HAVING . . . _n . . . .

The alias _n is derived numbering left to right. In some examples, operation is configured to operate as described above with reference to SELECT Clause.

Grammar

```
<group by clause> ::= GROUP BY <group key list> <aggregations>?
<having clause> ::= HAVING <expression>
<group key list> ::= <group key> ("," <group key>)*
<group key> ::= <expression> (AS? <identifier>)?
<aggregations> ::= AGGREGATE Aggregation function application> AS? <identifier> (","
<aggregation function application> AS? <identifier>)*
<aggregation function application> ::=
    <aggregation function> "(" (DISTINCT | ALL)? <expression> ("," <expression>)* ")"
<aggregation function> ::= ADD_TO_ARRAY | ADD_TO_SET | AVG | COUNT | FIRST |
LAST | MAX | MERGE_OBJECTS | MIN | PUSH | STDDEV_POP | STDDEV_SAMP | SUM
```

Example Operation: ORDER BY Clause & Behavioral Description

According to one embodiment, SQL's ORDER BY clause provides a way to order a result set by one or more sort keys. Each sort key can be a column reference, or can be an integer literal referring to a SELECT expression by its position in the select expr list. Sort keys that are column references can be compound identifiers. These compound identifiers can be qualified with datasource names or refer to document subfields. According to one example, name resolution follows the scoping rules—described in greater detail below.

According to one embodiment, the semantics implemented for ordering are consistent with the behavior described by section 13.1 of the SQL 92 Specification:

3) If an <order by clause> is specified, then the ordering of rows of the result is effectively determined by the <order by clause> as follows:

a) Each <sort specification> specifies the sort direction for the corresponding sort key Ki. If DESC is not specified in the i-th <sort specification>, then the sort direction for Ki is ascending and the applicable <comp op> is the <less than operator>. Otherwise, the sort direction for Ki is descending and the applicable <comp op> is the <greater than operator>.
b) Let P be any row of the result table and let Q be any other row of that table, and let PVi and QVi be the values of Ki in these rows, respectively. The relative position of rows P and Q in the result is determined by comparing PVi and QVi according to the rules of Subclause 8.2, "<comparison predicate>", where the <comp op> is the applicable <comp op> for Ki, with the following special treatment of null values. Whether a sort key value that is null is considered greater or less than a non-null value is implementation-defined, but all sort key values that are null shall either be considered greater than all non-null values or be considered less than all non-null values. PVi is said to precede QVi if the value of the <comparison predicate> "PVi <comp op> QVi" is true for the applicable <comp op>.
c) In the result table, the relative position of row P is before row Q if and only if PVn precedes QVn for some n greater than 0 and less than the number of <sort specification>s and PVi=QVi for all i<n. The relative order of two rows that are not distinct is implementation-dependent.

In some examples, the system is configured to clarify an implementation-defined behavior:

The system is configured to sort MISSING before NULL, and NULL before all other values (e.g., this is consistent with the behavior of MongoSQL's less-than operator)

Example Operation Rewrite: Positional Sort Keys to References

According to one embodiment, positional select-expression references in the ORDER BY clauses are rewritten to be expressions. The system is configured to check each sort key to determine whether it needs to be rewritten; if a sort key is any expression other than an integer literal, no transformation is needed. If a sort key is an integer literal, then it is treated as a one-indexed reference to the list of select expressions. The system is configured to perform a syntactic rewrite, substituting the alias of the select expression from the indicated position as the new sort key expression.

For example,
SELECT e1 AS a, e2 AS b FROM foo ORDER BY 1, 2
rewrite to
SELECT e1 AS a, e2 AS b FROM foo ORDER BY a, b According to some embodiments, there are a few circumstances under which the system generates an error/fail. For example, queries that lead to these circumstances that are disallowed can include:
A positional sort key is used with SELECT VALUE
A positional sort key is used with a select list containing a star expression Example Operations: Rewrite: Implicit to Explicit ASC According to one embodiment, the default sort key direction is ASC if not specified by the user. This is made explicit by a rewrite, where
. . . ORDER BY e, . . . .
rewrite to:
. . . ORDER BY e ASC, . . . .

Example Operation of Type Constraints

According to one embodiment, the ORDER BY clause requires that all possible values in a sort key expression can be statically verified by the system to be comparable via the > and < operators.

Example Grammar

<order by clause> ::= ORDER BY <sort specification> (, <sort specification> )*
<sort specification> ::= <sort key> <sort direction>?
<sort key> ::= <compound identifier> | <integer literal>
<sort direction> ::= ASC | DESC Example Operation & Behavioral Description According to various embodiments, the system is configured to implement LIMIT and OFFSET to allow users to retrieve only part of the rows generated by a query. Both LIMIT and OFFSET numbers are defined to be positive integers. In various executions, using LIMIT/OFFSET without ORDER BY does not guarantee the same result. If a LIMIT number is provided, no more than that number of rows will be returned. If an OFFSET number is provided, that number of rows is skipped before returning rows from the result.

In one embodiment, when LIMIT and OFFSET are both set, the first OFFSET rows will be skipped before returning the rest of the results which should contain no more than the LIMIT number rows. In one example, LIMIT i, j is defined on the system as a shorter form of LIMIT i OFFSET j. In further embodiments, the LIMIT and OFFSET operations can be used in subqueries, unlike in some SQL dialects. In some examples, enabling use in subqueries allows additional sorts (which can be in conjunction with the usual ORDER BY requirement). In further examples, the system can disallow reordering optimizations when LIMIT and OFFSET are invoked as part of a subquery.

Formally, for LIMIT i $$LIMIT_{out}^i = [\\ x\\ \text{for } x \in [x_1, ..., x_i]\\ \text{where } [x_1, ..., x_i, ..., x_j] = LIMIT_{IN}^i\\ ]$$

Formally, for OFFSET i $$OFFSET_{out}^i = [\\ x\\ \text{for } x \in [x_{i+1}, ..., x_j]\\ \text{where } [x_1, ..., x_i, ..., x_j] = OFFSET_{IN}^i\\ ]$$

Example Grammar

<limit clause> ::= LIMIT <integer literal> ("," <integer literal> )?
<offset clause> ::= OFFSET <integer literal>Rewrite As:
LIMIT i, j will be rewritten as
LIMIT i OFFSET j Example Operation: Set Operations & Behavioral Description According to some embodiments, the system is configured to provide a UNION ALL set operator for taking the union over the result sets of two select queries. In one example, the UNION ALL operator when executed is configured not to remove duplicate rows from the result set. In another example, when executed the result set returned by the UNION ALL operator does not have a defined order.

In some embodiments, the functionality associated with a distinct UNION operation is not supported, and likewise the INTERSECT or EXCEPT set operations can be excluded. In other embodiments, the system is configured to accept these refinements on UNION execution.

According to various embodiments, UNION ALL outputs all the documents from each side of the UNION ALL. For example, consider the output of the UNION ALL in the following query:

SELECT * FROM X UNION ALL SELECT * FROM Y
$UNION_{out}$=[x for x∈X, y for y∈Y]

Example Grammar

<set query>::=<select query><set operator><select query>
<set operator>::=UNION ALL?

According to some embodiments, operation of the union set operator and union join is unified in the abstract model, rather than have two different places in the query semantics that the system would otherwise implement as essentially the same operation.

Example Implementation Expressions
Example Grammar

```
<expression> ::= <unary operator expression>
    | <binary operator expression>
    | <is operator expression>
    | <like operator expression>
    | <between operator expression>
    | <case operator expression>
    | <scalar function expression>
    | <subquery expression>
    | <document expression>
    | <document field access expression>
    | <array expression>
    | <array index expression>
    | <array slice expression>
    | <identifier>
    | <parenthesized expression>
```

Example Operation: Identifiers & Behavioral Description

According to various embodiments, Identifiers can be used by the system to (e.g., MongoSQL implementation) refer to databases, tables, and columns. The SQL-92 spec says that by default identifiers should only contain simple latin letters, digits, and underscores, but it also explains that in different contexts the character set could be expanded. In some embodiments, the system is configured with identifiers that support most utf-8 characters. In some examples, the system includes an exception to this operation—for the null character, '\x00', as the null character is disallowed in BSON keys according to the known BSON spec.

According to various embodiments, there may be some semantic meaning associated with certain characters. For example, various grammar implementation includes using the "." character to create compound identifiers. Further examples are described herein of such characters. SQL-92 defines delimited (quoted) and regular (unquoted) identifiers. In various embodiments, the system defines regular identifiers that are restricted to a limited subset of identifiers to avoid conflicts with characters that have other semantic meaning; for an identifier to include such a character, it must be delimited. In one example, MongoSQL defines regular identifiers to avoid overlap. In other examples, an identifier can be delimited if it begins with a digit or if it conflicts with a reserved keyword.

In further embodiments, there exists a bijection (e.g., a one-to-one mapping) from defined (e.g., MongoSQL) identifiers to valid BSON keys. In one example, the above restrictions on regular identifiers enables the bijection that exists specifically from delimited MongoSQL identifiers to BSON keys.

In further example, since a valid BSON key could contain the identifier delimiter characters ("and `), the system defined identifiers must be able to contain these characters. To include only double quotes or only backticks, the other delimiter can be used (i.e. `"quoted"` or "`backticked`"). To include a delimiter character in an identifier delimited by that same character the system is configured to allow the users to double it (i.e. "contains_one_""" or `contains_one_` ` `, which correspond to contains_one_" and contains_one_`, respectively).

According to various embodiments, identifiers are defined to be case-sensitive, whether delimited or not. In some implementations, the system defined identifiers to be consistent with MongoDB identifiers for database, collection, and field names.

Example Operation: Aliases

According to some embodiments, Identifiers can be used for all aliases (e.g., in MongoSQL). In most cases, allowing aliases to be used more than once is a static semantic error. However, the system defined an exception to this—in that aliases can be repeated on both sides of a UNION. This also applies to automatically generated aliases (see description of SELECT Clause and FROM Clause for greater detail) conflicting with user aliases or user field names.

Example Keywords

In one embodiment, system defined (e.g., MongoSQL) keywords (such as SELECT, FROM, JOIN, etc.) are generally not allowed to be used as undelimited identifiers, to simplify lexing/parsing.

In some embodiments, the system notifies users that additional keywords are reserved to add functionality. To ensure that a query will not start failing with a newer version of the dialect, system, or MongoSQL, the system advises the users to delimit all identifiers that could become identifiers with system functionality.

In most use cases, however, such an approach is likely to be unnecessary. Some mitigating factors to consider:

If a new keyword is introduced, it is very likely that it will be a keyword in another existing SQL dialect, or a stage name in MQL When possible, the system is configured to allow newly introduced keywords to continue to be used as identifiers Example Grammar

```
<compound identifier> ::= <identifier> ("." <compound identifier>)?
<identifier> ::= <regular identifier> | <delimited identifier>
<regular identifier> ::= ([A-Za-z] | "_")[A-Za-z0-9_]*
<delimited identifier> ::= " identifier character>* "
    | ` identifier character>* `
<identifier character> ::= [^\x00]
```

According to some embodiments, the system is configured to require UTF-8 identifiers. In other embodiments, the system can relax the requirement later (for example, to resolve customer issues, among other options).

Example Functionality: Special Characters in Identifiers

According to various embodiments, the system uses delimited identifiers when semantically significant characters, i.e. ".", are part of an identifier. An alternative embodiment includes system definition of a mechanism for escaping characters in identifiers, such as an escape character. While various embodiments do not implement this functionality as there is no precedent for it in other SQL dialects—some example can provide the functionality and/or permit its operation as an administrator setting.
Example Functionality: Case Sensitivity In some embodiments, the system defines identifiers to be case sensitive consistent with SQL-92 specifics.
Example Operation: Literals & Behavioral Description According to various embodiments, the system (and for example, any implemented dialect (e.g., MongoSQL)) is configured to support literals for booleans, null, numbers, and strings. Booleans, null, and strings are represented as expected, as seen in the grammar examples described herein. In some examples, strings are enclosed in single quotes. To include a single quote character in a string literal—double it. In further example, numbers are implemented on the system with slightly more nuance: for example, literal integers are typed as INT when possible (i.e. values within the int32 range) and LONG otherwise, and literal floating point numbers or scientific notation numbers are considered to have type DOUBLE. In one example, the grammar does not specify signs for numeric literals. Thus, to write a literal negative number, users can use the unary minus operator before the numeric literal (in various implementation this is effectively the same as supporting literal negative numbers).

In some embodiments, the system does not support literals for every type, for example OBJECTID, BSON_DATE, and DECIMAL have no literal syntax. For such types, the system permits pseudo-literal values that can be obtained by using the CAST operator to go from a string or numeric representation of those types to their respective type. Some types may also have "constructor" functions which alias the relevant CAST invocations. See the examples described for Type Conversions for greater details. In further embodiments, the system is configured to enable options for escaping the string delimiter.

Other escapes like \n can enable options for escaping the string delimiter.
Example Grammar

```
<literal> ::= <null literal> | <boolean literal>
    | <string literal> | <numeric literal>
<null literal> ::= NULL
<boolean literal> ::= TRUE | FALSE
<string literal> ::= ' <any utf-8 character>* '
<numeric literal> ::= <integer literal> | <double literal>
<integer literal> ::= 0 | ([1-9] [0-9]*)
<double literal> ::= (<integer literal> "." <exp component>?)
    | (<integer literal>? "." [0-9]+ <exp component>?)
    | (<integer literal> <exp component>)
<exp component> ::= (e | E) ("+" | "-")? [0-9]+
```

In some alternatives, extended JSON can be used as an option for representing all BSON/MongoSQL types as literals, however in other embodiments this approach is not used.
Example Operation: Parenthesized Expressions According to various embodiments, a parenthesized expression is an expression grouped by parentheses, similar to the majority of programming languages and other implementations of SQL-92 compliant SQL dialects. Any time infix operators are present, the need for parentheses (or a similar mechanism) to distinguish order of operations may be necessary. In some examples, the system (and/or MongoSQL) can be configured with several infix operators, such as '+' and '::'. For example, the value of 1+2*3 is 7, while the value of (1+2)*3 is 9.
Example Grammar <parenthesized expression>::="("<expression>")"

Example Operation: Operators & Behavioral Description

According to some embodiments, the system (and/or MongoSQL) is configured to provide several operators for the built-in data types. For example, the system supports the operators defined in the SQL-92 spec. In some embodiments, there is at least one exception—where there is no support for the INTERVAL data type. Arithmetic operators involving BSON_DATE and INTERVAL values are unsupported in such embodiments. The examples described for data types provide more details on supported types associated with various embodiments.

In addition to the SQL-92 operators, the system (and for example MongoSQL) include functions for array and document operators. Some examples are described below with respect to document and field-access expressions below, and array, indexing, and slicing expressions below and details on the array index access operator.

The SQL-92 spec describes operators as monadic, dyadic, or n-adic, corresponding to operators having one operand, two operands, or a variable number of operands, respectively. The following examples, use the adjectives unary, binary, and n-ary to describe operators.

In various embodiments, operators can be divided into several different groups. There are string operators, arithmetic operators, comparison operators, boolean operators, control-flow operators, and type operators. The following description provides examples of implementation and functionality to illustrate the behavior of each type of operator.
Example Operation: Semantics of String Operators According to some embodiments, string operators are those which operate on strings. The operands of string operators are configured to statically have type NULL or STRING, and may evaluate to MISSING. For example, if an operand evaluates to NULL or MISSING, the system is configured to define the result of the operation is NULL.

In some embodiments, the binary string operator || specifies string concatenation. The operator returns the string made by joining its string operands in the order given. In one example, the result of string concatenation either has type NULL or STRING.

In another example, the 3-ary string operator LIKE determines whether a string matches a pattern. The third argument is optional. When provided, it specifies an escape character used in the pattern. If the third argument is not specified, there is no escape character. In the pattern, an unescaped underscore character '_' represents any single character and an unescaped percent character '%' represents any number of characters, even zero characters.

To paraphrase SQL-92: "If there is not a partitioning of the pattern into substrings such that each substring has length 1 or 2, no substring of length 1 is the escape character, and each substring of length 2 is the escape character followed by either the escape character, an '_', or a '%'," then the result is NULL. This behavior is modelled in various embodiments. For example, the first two operands do not need to be string literals, they can be any expressions that statically have type NULL or STRING. If provided, the optional third argument must be a literal string consisting of exactly one character, any other value produces a static error. The result of LIKE either has type NULL or BOOL.

The inverse, NOT LIKE, is syntactically the same as for the negation of the result of LIKE. As in,
e1 NOT LIKE e2
Rewrite as:
NOT (e1 LIKE e2)

Example Operation: Semantics of Arithmetic Operators

According to various embodiments, arithmetic operators are those which operate on numeric data types. The operands of arithmetic operations must statically have type NULL or a numeric type—INT, LONG, DOUBLE, or DECIMAL—and may evaluate to MISSING. If an operand evaluates to NULL or MISSING, the result of the operation is NULL. There are unary and binary arithmetic operators, described below.

The unary arithmetic operators + and − specify unary addition and unary subtraction, respectively. These unary operators are used to specify the sign of their operands. Unary addition does not change its operand; unary subtraction reverses the sign of its operand. The result of a unary arithmetic operation has the same type as its operand.

The binary arithmetic operators +, −, *, and / specify addition, subtraction, multiplication, and division, respectively. If the value of a divisor is zero, then the result of division is NULL. The operands of binary arithmetic operations do not need to have the same type; any combination of valid operand types (as declared at the beginning of this section) is allowed. When both operand types are numeric, the result of a binary arithmetic operation has a type according to the following table:

| Type of Operand 1    | Type of Operand 2 | Result  |
|----------------------|-------------------|---------|
| INT                  | INT               | INT     |
| INT or LONG          | LONG              | LONG    |
| Any numeric non-DECIMAL | DOUBLE         | DOUBLE  |
| Any numeric          | DECIMAL           | DECIMAL |

For division operations including only INTs and/or LONGs, the result does not have to exactly an INT or LONG and for those cases can be truncated or rounded, for example. For example, 5/2 is truly 2.5, however the result must be an INT since the operands are both INTs. The choice of whether to round or truncate is implementation-defined according to various embodiments.

Note that arithmetic operations that result in overflow or underflow have undefined behavior. For example, if 1 (an INT) is added to the maximum INT value, the result exceeds the bounds of the INT type and therefore cannot be represented as an INT. Various embodiments of the MongoSQL dialect are not required to specify behavior for such cases. Various options exist, throw an error, return a different type, etc.

Example Semantics of Comparison Operators

According to some embodiments, comparison operators are those which compare values. The operands of comparison operations is defined statically to have comparable types. In most cases, that means the operands must have the same type (or NULL). The exceptions to this are numeric types. Any combination of numeric types can appear as operands for comparison operators. If an operand evaluates to NULL or MISSING, the result of the operation is NULL.

According to some embodiments, the binary comparison operators <, <=, < >, =, >, and >= specify less than, less than or equals, not equals, equals, greater than, and greater than or equals, respectively. In some embodiments, the system (and for example, MongoSQL) does not support comparison operations on structured data (e.g., documents and arrays). Booleans are compared such that FALSE is less than TRUE. Numbers are compared with respect to their algebraic values. Strings are compared lexicographically. Datetimes are compared as expected. The result of a binary comparison operation has either type NULL or BOOL.

In further embodiments, the != operator is a non-standard operator that specifies not equals. Despite being non-standard, such operation is expected by many users. Various system embodiments are configured to supports the operation as well, though it is rewritten to the standard < > operator:
a!=b
rewrite as:
a< >b In other embodiments, the 3-ary comparison operator BETWEEN specifies a range comparison. Logically, the expression x BETWEEN y AND z is equivalent to x>=y AND x<=z, though the specification does not define or require the operation to be rewritten as such. For example, the same type constraints and comparison behaviors as described above for the binary comparison operators apply to BETWEEN. The result of a BETWEEN operation has either type NULL or BOOL.

The inverse, NOT BETWEEN, is syntactic equivalent for the negation of the result of BETWEEN. As in,
e1 NOT BETWEEN e2 AND e3
rewrite as:
NOT (e1 BETWEEN e2 AND e3)

Example Semantics of Boolean Operators

In various embodiments, Boolean operators are those which operate on boolean data types. The operands of boolean operations are defined to statically have type NULL or BOOLEAN, and may evaluate to MISSING. If an operand evaluates to NULL or MISSING, the result of the operation is NULL. There are unary and binary boolean operators, described below.

The semantics of the unary boolean operator NOT are described by the truth table below.

| A               | NOT a |
|-----------------|-------|
| TRUE            | FALSE |
| FALSE           | TRUE  |
| NULL or MISSING | NULL  |

The semantics of the binary boolean operators OR and are described by the truth table below.

| A               | B               | a AND b | a OR b |
|-----------------|-----------------|---------|--------|
| TRUE            | TRUE            | TRUE    | TRUE   |
| TRUE            | FALSE           | FALSE   | TRUE   |
| TRUE            | NULL or MISSING | NULL    | TRUE   |
| FALSE           | TRUE            | FALSE   | TRUE   |
| FALSE           | FALSE           | FASLE   | FALSE  |
| FALSE           | NULL or MISSING | FALSE   | NULL   |
| NULL or MISSING | TRUE            | NULL    | TRUE   |
| NULL or MISSING | FALSE           | FALSE   | NULL   |
| NULL or MISSING | NULL or MISSING | NULL    | NULL   |

Example Semantics of Control-Flow Operators

Various embodiments (and for example MongoSQL) support the CASE operator for control-flow. In this context, "control-flow" refers to conditionally producing values based on criteria argued to the operator. Concretely, a CASE expression consists of one or more "WHEN clauses," which each specify a boolean condition and a result, and an "ELSE clause," which specifies a default result if none of the conditions are TRUE. The result of a CASE expression is the result of the first (leftmost) WHEN clause whose condition is TRUE, or the default result specified by the ELSE clause if none of the conditions are TRUE. The type of the result of a CASE expression is the union of types from the WHEN and ELSE clauses.

SQL-92 specifies two forms of the CASE expression, simple and searched.

Various embodiments are configured to enables such operations, for example, via a simple CASE expression having the following form:
CASE co WHEN wo$_1$ THEN r$_1$ WHEN wo$_2$ THEN r$_2$ . . . ELSE r$_d$ END In this form, the first expression, co, is the "case operand," the WHEN expressions, wo$_i$, are the "when operands," and the THEN and ELSE expressions, r$_i$, are the potential result values ("d" stands for "default"). The result of a simple CASE expression is the r$_i$ corresponding to the first (leftmost) wo$_i$ for which co=wo$_i$ evaluates to TRUE, or r$_d$ if none of the comparisons evaluate to TRUE. This is equivalent to a searched CASE expression where each condition is co=wo$_i$, though this specification does not defined or require that that simple CASE expressions be rewritten as searched CASE expressions. Since the case operand and when operands are compared using the equals operator, these operands follow the type constraint rules described above with respect to examples of the Comparison Operators.

A searched CASE expression has the following form:
CASE WHEN c$_1$ THEN r$_i$ WHEN c$_2$ THEN r$_2$ . . . ELSE r$_d$ END In this form, the WHEN expressions, c$_i$, are the "search conditions," and the THEN and ELSE expressions, r$_i$, are the potential result values ("d" stands for "default"). The result of a searched CASE expression is the r$_i$ corresponding to the first (leftmost) c$_i$ that evaluates to TRUE, or r$_d$ if none of the conditions evaluate to TRUE. In various embodiments, the search conditions are defined statically to have type NULL or BOOLEAN, and may evaluate to MISSING. If a condition evaluates to TRUE, its corresponding result is the result of the expression. Therefore, if a condition evaluates to NULL or MISSING, nothing special happens; the result of the expression is either the next result corresponding to a TRUE condition or the default result if none of the following conditions evaluate to TRUE.

In some examples, for either form of the CASE expression, if an ELSE clause is not provided, then ELSE NULL is implicit. As in,
CASE o WHEN e THEN r END
Rewrite as:
CASE o WHEN e THEN r ELSE NULL END
and
CASE WHEN e THEN r END
Rewrite as:
CASE WHEN e THEN r ELSE NULL END Example Semantics of Type Operators In further embodiments, the system (and for example MongoSQL) is configured to provide the binary IS operator to check the type of an expression. The left operand can be any expression and the right operand can be any type name (e.g., MongoSQL type name) or the keyword MISSING. The operator returns TRUE if the argued expression evaluates to a value of the argued type, and FALSE if it evaluates to a value of a different type. If the left operand evaluates to MISSING, the operator returns TRUE if the right operand is the keyword MISSING or NULL, and FALSE otherwise. The result of the IS operator therefore always has type BOOL.

The SQL-92 "null predicate", <expr> IS NOT? NULL, returns TRUE if the expression is a NULL value and FALSE otherwise. In various embodiments (and for example, MongoSQL), NULL is a type with a single value (also called NULL), and the value MISSING is more analogous to SQL's NULL. To support the SQL-92 "null predicate", the system can implement the following semantics for IS NULL and IS MISSING.

| A | A IS NULL | A IS MISSING |
|---|---|---|
| NULL | TRUE | FALSE |
| MISSING | TRUE | TRUE |

For example, the operation <expr> IS NOT? NULL does not require a strict type-checking operation described in the preceding examples; it is more like the value-checking operation defined by SQL-92.

The inverse, IS NOT, is syntactic equivalent for the negation of the result of IS. As in,
e IS NOT t
is rewritten as:
NOT (e IS t)

Example Grammar

```
<unary operator expression> ::= <unary operator> <expression>
<unary operator>       ::= + | - | NOT
<binary operator expression> ::=
    <expression> <binary operator> <expression>
<binary operator> ::= -
    | *
    | /
    | +
    | ||
    | AND
    | OR
    | <comparison operator>
<comparison operator> ::= <
    | <=
    | <> | !=
    | =
    | >
    | >=
<is operator expression> ::= <expression> IS NOT? (<type> | MISSING)
<like operator expression> ::=
    <expression> NOT? LIKE <expression> (ESCAPE <string literal>)?
<between operator expression> ::=
    <expression> NOT? BETWEEN <expression> AND <expression>
<case operator expression> ::=
    CASE <when clause>+ <else clause>? END
    | CASE <expression> <when clause>+ <else clause>? END
<when clause> ::= WHEN <expression> THEN <expression>
<else clause> ::= ELSE <expression>
```

According to various embodiments, numeric values will be compared according to their true mathematical value. For example, the semantics for comparing different numeric types are compared to their true mathematical value (e.g., Is NumberDouble(20) the same as NumberDecimal(20)). In other examples, the system is configured to support the SQL-92 <null predicate> operator "<expr> IS [NOT] NULL" as a type-checking operator (since NULL is a type with a single value (also called NULL)).

Various embodiments do not define or implement support of the SQL-92 <boolean test> operator IS. For example, the system (and for example MongoSQL) does not support <expr> IS NOT?<bool value>. This operator is not strictly required for SQL compatibility, and the result of not supporting it is the benefit that IS can unambiguously be used as the type-check operator.

Although various embodiments are configured not to support comparisons for structured data (documents and arrays). There are some embodiments provide options for structured data comparisons (e.g., the system can provide a definition of how to handle NULL elements, for example). In other examples, the system leverages the fact that structured data types are not part of SQL-92 to simplify management of structured query operation.

In various dynamic schema environments supported are polymorphic comparisons. In some examples, the system does not support and/or disables polymorphic comparison in executing the structure query dialect (e.g., MongoSQL). In some environments, comparisons can be supported and detailed as part of the implementation.

In various embodiments, the query language specification does not require that implementations rewrite BETWEEN operations as ANDs of less than and greater than operations. This is left up to implementations (and for example administrative or design selection) since prescribing the rewrite would necessitate that the first operand be copied multiple times (one for each comparison), with the result that could impact performance.

In other examples, the definition of the query language specification does not require that implementations rewrite simple CASE expressions to searched CASE expressions. In some examples, the option to execute this rewrite is made an implementation choice (e.g., DB admin and/or designer choice for example).

Example Operation: Scalar Functions & Behavioral Description

According to various embodiments, the system can implement most scalar functions defined in the SQL-92 spec, with a few exceptions described in greater detail below. In addition to the SQL-92 functions, the system (and for example MongoSQL) also specifies a general syntactic construct that implementations can use to introduce additional scalar functions. For example, not all scalar functions from an underlying MongoDB aggregation are defined in various embodiments of the system (and for example an associated specification) but any function of the underlying database can be included in various embodiments.

According to some embodiments, the query language can define a set of required scalar functions—examples of required sets are described in greater detail below. To illustrate example functionality, the scalar functions can be separated into groups based on their behavior, input types, or output types. The following descriptions and examples describe the basics of what the functions do as well as any static type constraints on their arguments (e.g., where relevant)—Appendix _____ describes additional aspects of the full behavior details.

Example Operation: Conditional Scalar Functions

According to some embodiments, conditional scalar functions are those which specify a conditional value. The SQL-92 specification requires the NULLIF and COALESCE conditional functions. These functions are equivalent to CASE operations, though various embodiments are configured to support their operation without requiring syntactic rewrite.

According to some examples, the NULLIF(v1, v2) scalar function returns NULL if v1=v2 is TRUE, and otherwise returns v1. Since the arguments are compared for equality, the system is configured to defined them as statically comparable—for example, by implementing the rules described above with respect to the Comparisons Operators examples above. Based on various embodiments the following example functions are described with respect to equivalent CASE operations.

For example, NULLIF(v1, v2) is equivalent to the following searched CASE operation:
CASE WHEN v1=v2 THEN NULL ELSE v1 END
The COALESCE(v1, v2, . . . , vn) scalar function returns the first non-NULL argument, or NULL if there are no non-NULL arguments.
COALESCE(v1, v2) is equivalent to the following searched CASE operation:
CASE WHEN v1 IS NOT NULL THEN v1 ELSE v2 END
and COALESCE(v1, v2, . . . , vn) is equivalent to:
CASE WHEN v1 IS NOT NULL THEN v1 ELSE COALESCE(v2, . . . , vn) END Example Type Conversion Scalar Function In further embodiments, the type conversion scalar function CAST converts an expression to a specified type. Described above are additional examples of the CAST scalar function.

Example Array Scalar Functions

In various embodiments, array scalar functions are those which operate on arrays. The system can specify at least two such scalar functions, SLICE and SIZE. Additional implementation examples are described below and provide additional detail about the SLICE scalar function.

In another example, the SIZE(array) scalar function counts and returns the total number of items in an array. The semantics of the SIZE function mostly match those of the aggregation operator implement in the known MONGODB database and the $size operation. In some examples, the type constraints are more relaxed than $size operator. In some embodiments, the system is configured to define the argument to statically have type ARRAY or NULL, and may also be missing. In another example, if the argument is NULL or MISSING, the result is NULL.

Example Numeric Value Scalar Functions

According to one embodiment, numeric value scalar functions are those which return numeric values. The SQL-92 specification requires the POSITION, CHAR_LENGTH, OCTET_LENGTH, BIT_LENGTH, and EXTRACT numeric value functions.

The POSITION(substring IN string) scalar function returns the position of the first occurrence of substring in the string, or −1 if it does not occur. Various embodiments, and for example, MongoSQL, use 0-indexing, so the first character is at position 0, the second at position 1, and so on. In further example, the system is configured to define the arguments statically to have type STRING or NULL, and may be missing. If either argument is NULL or MISSING, the result is NULL.

The function CHAR_LENGTH may also be written as CHARACTER_LENGTH. The system (and for example MongoSQL) can be configured to rewrite the latter into the former, so that CHAR_LENGTH is the canonical form of the function name.

The length functions CHAR_LENGTH(string), OCTET_LENGTH(string), and BIT_LENGTH(string) return the length of string arguments in terms of characters, bytes, and bits, respectively. In some embodiments, the system is configured to enable the semantics of CHARACTER_LENGTH match those of the aggregation operator $strLenCP of the known MongoDB database; further examples match the semantics of OCTET_LENGTH match those of the MongoDB aggregation operator $strLenBytes;

the semantics of BIT_LENGTH also match those of $strLenBytes, as well, except the result is multiplied by 8. For each, the argument is defined on the system to statically have type STRING or NULL, and may be missing. If the argument is NULL or MISSING, the result is NULL.

The EXTRACT(field FROM source) scalar function extracts a component of a datetime value. The source argument is defined statically to have type TIMESTAMP or NULL, and may be missing. If it is NULL or MISSING, the result is NULL Example String Value Scalar Functions String value scalar functions are those which return string values. The SQL-92 specification requires the SUBSTRING, UPPER, LOWER, CONVERT, TRANSLATE, and TRIM numeric value functions; however, various embodiments (and for example MongoSQL) do not require CONVERT or TRANSLATE.

The SUBSTRING(string FROM start FOR length) scalar function returns a substring of the first argument starting from start and extending either the specified length, if provided, or to the end of the string, if length is not provided or if it is negative. The SQL-92 specification defined a runtime error when the length is negative; various embodiments (e.g., MongoSQL) can deviate from this to be consistent with, for example MongoDB aggregation behaviors by returning the substring extending to the end of the string. Also, note that some embodiments (e.g., MongoSQL) use 0-indexing, so start should be 0 to start at the first character, 1 to start at the second, and so on. The unit of the start and length arguments is codepoint, not byte. This allows SUBSTRING to work in a reasonable way for strings containing multibyte characters. The string argument can be defined statically to have type STRING or NULL, and may be missing. The start and length arguments is defined statically to have type INT or NULL, and may be missing. If any argument is NULL or MISSING, the result is NULL. Note that the characters are 0-indexed, for consistency with MongoDB.

The UPPER(string) and LOWER(string) scalar functions, collectively known as "fold" functions, change the casing of their arguments to be all uppercase or all lowercase, respectively. Similar to the known and documented MongoDB aggregation operators $toLower and $toUpper, these functions only have well-defined behavior for strings of ASCII characters. For each, the argument is defined statically to have type STRING or NULL, and may be MISSING. If the argument is NULL or MISSING, the result is NULL.

The TRIM(spec substring FROM string) scalar function removes leading and/or trailing spaces, or an optionally specified substring, from the argued string. The first two arguments are optional; by default, they are BOTH and the space character, respectively. The latter two arguments is defined statically to have type STRING or NULL, and may be missing. If either is NULL or MISSING, the result is NULL.

As noted, the first two arguments for TRIM are optional and have the default values BOTH and the space character, respectively. Invocations with one or both arguments omitted rewrite to include the defaults. Specifically:

TRIM(str)

rewrite as:

TRIM(BOTH ' ' FROM str)

and

TRIM(substr FROM str)

Rewrite as:

TRIM(BOTH substr FROM str)

and

TRIM(spec FROM str)

Rewrite as:

TRIM(spec ' ' FROM str)

Example Datetime Value Scalar Functions

Datetime value scalar functions are those which return datetime values. The SQL-92 specification details the CURRENT_DATE, CURRENT_TIME, and CURRENT_TIMESTAMP datetime value functions; however, various embodiments (and e.g., MongoSQL) do not require CURRENT_DATE or CURRENT_TIME.

The CURRENT_TIMESTAMP scalar function returns the current timestamp, "with the time zone displacement equal to the current time zone displacement of the SQL-session."

The remaining semantics for MongoSQL's CURRENT_TIMESTAMP are consistent with the behavior described by section 6.8 of the SQL 92 Specification, which quoted here instead of attempting to rephrase:

2) If specified, <timestamp precision> . . . determines the precision of the . . . timestamp value returned. (Default value is 6 if none is provided).

3) If an SQL-statement generally contains more than one reference to one or more <datetime value function>s, then all such references are effectively evaluated simultaneously. The time of evaluation of the <datetime value function> during the execution of the SQL-statement is implementation-dependent.

Example Grammar

```
<scalar function expression> ::= <nullif function>
    | <coalesce function> | <size function> | position function>
    | <character length function> | <octet length function>
    | <bit length function> | <extract function>
    | <substring function> | <fold function> | <trim function>
    | <current date function> | <current time function>
    | <current timestamp function>
    | <regular identifier> "(" <expression>* ")"
<nullif function> ::= NULLIF "(" <expression> "," <expression> ")"
<coalesce function> ::=
    COALESCE "(" <expression> ("," <expression>)* ")"
<size function> ::= SIZE "(" <expression> ")"
<position function> ::= POSITION "(" <expression> IN <expression> ")"
<character length function> ::=
    (CHAR_LENGTH | CHARACTER_LENGTH) "(" <expression> ")"
<octet length function> ::= OCTET_LENGTH "(" <expression> ")"
<bit length function> ::= BIT_LENGTH "(" <expression> ")"
<extract function> ::=
    EXTRACT "(" <extract field> FROM <expression> ")"
```

-continued

```
<extract field> ::= TIMEZONE_HOUR | TIMEZONE_MINUTE
    | YEAR | MONTH | DAY | HOUR | MINUTE | SECOND
<substring function> ::=
    SUBSTRING "(" <expression> FROM <expression> (FOR <expression>)? ")"
  | SUBSTRING "(" <expression> "," <expression> ("," <expression>)? ")"
<fold function> ::= (UPPER | LOWER) "(" <expression> ")"
<trim function>   ::= TRIM "(" <trim options>? <expression> ")"
<trim options>    ::= <trim specification>? <expression>? FROM
<trim specification> ::= LEADING | TRAILING | BOTH
<current timestamp function> ::=
    CURRENT_TIMESTAMP ("(" <expression> ")")?
```

According to some embodiments, the system does not define or require that implementations rewrite NULLIF or COALESCE functions as CASE operations. This is left up to implementation by the database admin or designer as prescribing the rewrite would necessitate that one or more operands be copied multiple times which could have performance implications.

Conformance-level restrictions in SQL-92 directed that some embodiments string value functions CONVERT and TRANSLATE reject the and competitors' lack of support for them.

Similarly, the SQL-92 specified datetime value functions CURRENT_DATE and CURRENT_TIME can be excluded in MongoDB implementations because they do not support the DATE or TIME types at this time.

Example Operation: Subquery Expressions & Behavioral Description

A subquery is a SQL query within a query.

A subquery may occur anywhere an expression can be used.

When executing a subquery, the system/dialect set $\rho_0$ for the subquery to the current $\rho$ for the outer scope in which the subquery is executed. This means values from the current executing row are available to the subquery expression.

Behavior for three example types of subqueries are defined in SQL-92:

Scalar subquery, which returns a result set with zero or one row and one column. This is the simplest form of a subquery, and can be used in most places a literal or single column value is valid Row subquery, which returns a result set with zero or one row and more than 1 column Table subquery, which returns 0 or more rows and one or more columns Various system embodiments (and e.g., MongoSQL) are configured to supports the various subqueries and others are other embodiments are configured to support scalar subquery and table subquery.

A table subquery can be defined for use at the right hand side(rhs) of a multiple-row operator such as IN, ANY, SOME, ALL, EXISTS. Example behavior is described in greater detail below.

In various embodiments, the subquery is defined statically to prove its degree is equal to the expression on the other side of the operator. The degree of the subquery should either be derived from the SELECT clause expression list or in the subquery (SELECT * FROM foo), such information can be to be derived from foo's schema. Otherwise, the compilation triggers a fail condition.

Oher subqueries where table subquery is not applicable can eb defined to be a scalar subquery. For scalar subquery, static check is executed to validate the degree of the subquery is 1 and the cardinality is no larger than 1. Otherwise, the compilation triggers a fail condition.

A scalar subquery expression evaluates to the single value returned by the contained query. If the result of the query expression is empty, the subquery will return MISSING.

The current environment from the outer query is inherited by the subquery. Described in greater detail below (see scoping). Thus various system embodiments support correlated queries (a subquery using values from an outer query) such as:

```
SELECT employee_number, department
    FROM employees AS emp
    WHERE salary > (
    SELECT AVG(salary)
    FROM employees
    WHERE department = emp.department);
```

SQL-92 defines the resolution strategy for unqualified identifiers in subquery. In various system embodiments (and e.g., MongoSQL) execution handles queries without a schema. Some examples are configured to not to allow subquery reference to an unqualified identifier in the schema-less setting with the following example exceptions. The reasoning is elaborated below—see unqualified identifier.

1. If an unqualified name is referring to an identifier in subquery's local scope, validate statically that the identifier exists in subquery's data source.

For example:

SELECT * FROM foo WHERE EXISTS(SELECT * FROM [{a: 1, b: 1}] AS bar WHERE bar.b=a)

allowed because the system can statically prove field "a" exists in datasource bar and according to SQL standard, the unqualified identifier should be resolved to the most local scope which contains it.

SELECT * FROM foo where EXISTS(SELECT * FROM bar WHERE bar.b=a)

generates compiling error because system cannot statically prove field "a" exists in bar.

2. If an unqualified name is referring to an identifier in subquery's outer scope, validate statically that the identifier does not exist in subquery's local scope and it exists in subquery's outer scope.

For example:

SELECT * FROM [{a: 1}] AS foo WHERE EXISTS (SELECT * FROM [{b: 1}] AS bar WHERE bar.b=a)

allowed because system can statically prove field "a" only exists in datasource foo but not in bar.

SELECT * FROM foo where EXISTS(SELECT * FROM [{b: 1}] AS bar WHERE bar.b=a)

or

SELECT * FROM [{a: 1}] AS foo WHERE EXISTS (SELECT * FROM bar AS bar WHERE bar.b=a) generates compiling errors because in the first query, system cannot statically prove field "a" exists in foo. And in the second query, system cannot statically prove field "a" does not exist in bar.

Example Grammar

<subquery expression>::="("<select query>")"

Example Excluded Functionality: Row Constructors

Some embodiments are designed by choice not to support row constructors. This option provide a simpler construction, avoiding the need to distinguish table subqueries and row subqueries, since row subqueries are only different when compared to row constructors. Other examples provide this support and can be made available as a design choice for DBA or database designers.

Example Unqualified Identifier

The system can be designed to only support unqualified identifiers in subquery in the cases listed above, due to the ambiguity generated by the missing qualifiers. For example, in following query and catalog:

```
SELECT * FROM foo where EXISTS(SELECT * FROM bar WHERE bar.b = a)
ρ_c = {
  test: {
    foo: [
      { a: 1}
    ],
    bar: [
      { b: 1}
      { a: 2, b: 2}
    ]
  }
}
```

The system can interpret this "a" in the subquery as either foo.a or bar.a by evaluating either one of the records in bar. If the system reads record {b: 1} first, according to SQL standard, the unqualified identifier "a" should be resolved to foo.a. Otherwise, it should be resolved to bar.a. Such undefined behavior is excluded by design.

Example Operation: Behavior and Grammar for IN, ANY, SOME, ALL, EXISTS

In various embodiments, an ANY predicate determines whether a target value matches any value in the subquery for a provided comparison operator. The result is equivalent to the logical disjunction of the comparisons between the target value and each value in the subquery result set. If one of the comparison predicates returns TRUE, the result of the ANY predicate is TRUE. Else, if any of the comparison predicates returns NULL, the result is NULL. In all other cases, the result is FALSE.

The comparisons are configured to follow the same rules from the examples described for comparison operators above, which means the types on both sides of the quantifier are statically proven by the system to be comparable. This applies to the other predicates in this section which also involves comparison operators.

For example:

1=ANY(SELECT a FROM [{a: 1}, {a: NULL}] AS arr) predicate evaluated to
(1==1) OR (1==NULL)→TRUE OR NULL→TRUE
1=ANY(SELECT a FROM [{a: 0}, {a: NULL}] AS arr) predicate evaluated to
(1==0) OR (1==NULL)→FALSE OR NULL→NULL
1=ANY(SELECT a FROM [{a: 0}, {a: 2}] AS arr) predicate evaluated to
(1==0) OR (1==2)→FALSE OR FALSE→FALSE The SOME quantifier is equivalent to ANY. They generate the same result and can be used interchangeably.

An ALL predicate determines whether a target value matches all the values in the subquery for a provided comparison operator. The result is equivalent to logical conjunction of the comparisons between the target value and each value in the subquery result set. Only if all the comparison predicates return TRUE, the result of the ALL predicate is TRUE. If any comparison predicate returns FALSE, the result is FALSE. In all other cases, the result is NULL.

For example:

1=ALL(SELECT a FROM [{a: 1}, {a: NULL}] AS arr) predicate evaluated to
(1==1) AND (1==NULL)→TRUE AND NULL→NULL
1=ALL(SELECT a FROM [{a: 0}, {a: NULL}] AS arr) predicate evaluated to
(1==0) AND (1==NULL)→FALSE AND NULL→FALSE
1=ANY(SELECT a FROM [{a: 1}, {a: 1}] AS arr) predicate evaluated to
(1==1) AND (1==1)→TRUE AND TRUE→TRUE An IN predicate determines whether a target value equals any value in a subquery or list of expressions. When it is a table subquery on the right hand side of the predicate, this statement is rewritten, in various embodiments, with ANY predicate and has the same behavior.

X IN Y rewritten to

X=ANY(Y)

In the case there is a comma separated expression list on the right hand side of the predicate, the expression list is rewritten (see also rewrites section below) with subquery and the same rewrite as above will be used.

An EXISTS predicate evaluates to TRUE providing the subquery result set is not empty, otherwise it evaluates to FALSE. This predicate does not evaluate to NULL by definition.

Example Grammar

```
<subquery> ::= "(" <select query> ")"
<in predicate> ::= <expression> NOT?
   IN (<subquery> | "("<in value list>")" )
<in value list> ::= <expression> (, <expression>)?
<any predicate> ::= <expression> <comparison operator> ANY
   <subquery>
<all predicate> ::= <expression> <comparison operator> ALL <subquery>
<exists predicate> ::= EXISTS <subquery>
```

Example Rewrites

X IN <subquery>
rewrite to
X=ANY <subquery>
X IN (A, B, C)
rewrite to
x=ANY(SELECT _1 FROM [{_1: A}, {_1: B}, {_1: C}])
X NOT IN <subquery>
rewrite to
X < > ALL(<subquery>)
X NOT IN (A, B, C)

rewrite to x < > ALL(SELECT _1 FROM [{_1: A}, {_1: B}, {_1: C}])

X=SOME(Y)

rewrite to

X=ANY(Y)

Example Operation: Document and Field-Access Expressions & Behavioral Description According to some embodiments, documents can be represented with a syntax similar to JSON objects. Keys are defined to be strings and values can have any of the supported types for an underlying database (e.g., MongoDB & supported types). To access document fields, query interpretation (and e.g., MongoSQL) supports various options including "dot" notation and "bracket" notation.

For example, dot notation is similar to field access in MongoDB aggregation. In one example, if a document doc contains a field f, then the expression doc.f is used to access the value of that field. This type of expression is a compound identifier as discussed above with respect to Identifiers.

In another example, bracket notation uses square brackets, [ and], around a field name to access the field with that name. For example, consider the same document described before: doc["f"] is used to access the value of that field.

Document field access <expr>[<subfield>] has the following behavior:

<expr> statically defined to have type DOCUMENT or NULL, and may be missing.
  If it is NULL or missing, the field access expression evaluates to NULL.
  If it is DOCUMENT, the field access expression evaluates to the value of the subfield or MISSING if the subfield does not exist.
<subfield> statically defined to have type STRING. Users can wrap the argument in CAST or use a type assertion to ensure this. See the examples describing type conversion for more details on casting.

Example Grammar

```
<document expression> ::= { }
    | { <key-value pair> (, <key-value pair>* }
<key-value pair> ::= <string literal> ":" <expression>
<document field access expression> ::= <compound identifier>
    | <expression> "." <compound identifier>
    | <expression> "[" <expression> "]"
```

Example Operation: Array, Indexing, and Slicing Expressions & Behavioral Description According to various embodiments, arrays are ordered lists of values. Elements can have any of the underlying DB supported types (e.g., MongoDB supported types) and do not need to all be the same type. To access array elements, the system (and e.g., MongoSQL) supports the "bracket" notation <array>[<index>] and uses zero-indexing. For example, if an array arr contains the elements 1, 2, and 3 in that order, then the expression arr[0] is used to access the first element, 1.

For array element access, the <index> is defined statically to have type to NULL or INT, and may evaluate to MISSING. The semantics of array element access can match those of an underlying DB (e.g., the MongoDB aggregation operator $arrayElemAt. For example:

If the index is zero or positive, returns the element at that index, counting up from zero at the start of the array.
If the index is negative, returns the element at that index counting down from the end of the array, where −1 is the last element, −2 the second to last, and so on.
If the index exceeds the array bounds, returns MISSING.
If the index is NULL or MISSING, returns NULL.

Example Operation: Slicing

According to one embodiment, the system (and e.g., MongoSQL) supports slicing arrays to access subsets of arrays via the SLICE(<array>, <start>, <length>) scalar function as described above. The semantics of array slicing can match those of an underlying DB (e.g., the MongoDB aggregation operator $slice. For example:

If any of the arguments are NULL or MISSING, the result of the slice operation is NULL.
The <array> argument is required and is defined statically to have type ARRAY or NULL, and may be missing.
A <start> argument is optional. If provided, it is defined statically to have type INT or NULL, and may be missing.
  If positive, the slice starts at that position counting up from the start of the array.
    If it exceeds the bounds of the array, the resulting slice is empty.
  If negative, the slice starts at that position counting down from the end of the array.
    If it exceeds the bounds of the array, the starting position is the start of the array.
The <length> argument is required and is defined statically to have type INT or NULL, and may be missing.
  If <start> is provided, <length> must be positive; this will be enforced at runtime and the result will be NULL if it is not positive.
  If positive, the slice includes up to the first <length> elements from the <start> position, or from the start of the array if <start> is omitted.
  If negative, the slice includes up to the last <length> elements of the array.

Example Grammar

```
<array expression> ::= "[" "]"
    | "[" <expression> (, <expression>)* "]"
<array index expression> ::= <expression> "[" <expression> "]"
<array slice expression> ::=
    SLICE "(" <expression> , (<expression> ,)? <expression> ")"
```

Alternative embodiment can support SLICE with the following behavior:

Function: SLICE scalar function which maps onto $slice.
Operator:
  a. A slice operator that uses square brackets and a colon.
    <array>[<start>:<end>]
  b. A slice operator that uses square brackets and an ellipsis.
    <array>[<start> . . . <end>]

As both—the SLICE function and the slice operator.

The two approaches have different semantics, where the function approach usually has <start> and <length> parameters. The operator approach usually has <start> and <end> parameters, which takes the slice from the <start> index to the <end>−1 index. This can be supported in various alternative embodiments because 1) it does not map as cleanly onto $slice, 2) it would be unconventional to change it so that it did map cleanly onto $slice, and 3) it is not necessary to have two ways of doing the same thing.

Example Implicit Array Traversal

Implicit array traversal refers to the application of an operation over an array without explicit user-provided syntax to do so. There are many examples of this. One such example is field access on arrays in MongoDB aggregation.

For the agg expression "$arr.b", if the field ref $arr resolves to an array, then the subfield access for b is mapped over the array, resulting in an array. Another is conditional evaluation on arrays like the following:

```
ρ_c: { test: {
    foo: [
        {'a': [4, 5, 6]}
    ]
    }
}
SELECT a FROM foo WHERE a > 5
```

Implicit array traversal may apply the >5 operation to each element of the array a, resulting in true if any element meets the criteria. Alternatively, it could result in true if all elements meet the criteria. Regardless, various embodiment do not provide for implicit traversal. If users wish to achieve this behavior, they can use explicit syntax to operate over arrays.

Example Operation Null & Missing & Behavioral Description

In various MongoDB database implementations the MongoDB query Language "MQL" (as well as BSON itself) has a distinction between NULL and MISSING. In the case of NULL there is a field with the literal value NULL, whereas in the case of MISSING, the field is gone. Various embodiments, maintain this distinction in structured query processing (and do so for several reasons):

- Maintaining the distinction simplifies translations, results in faster query performance (no conditionals to upconvert missing to NULL like in the BI Connector).
- Upconverting MISSING to NULL for base fields in the collection would require collecting the list of every field in every document for SELECT * cases when no static schema is provided for the collections used in the query.

Example Specific Expression Semantics

According to various embodiments, the specific NULL/MISSING expression semantics are defined to be consistent with SQL92, for SQL92 operators.

Example: String Operators

For string operators, a MISSING as any argument will be treated as NULL, and the entire result shall be NULL. See operators description above.

Example: Arithmetic Operators

MISSING as either argument will be treated as NULL, and the result shall be NULL. See operators description above.

Example: Comparison Operators

For SQL92 comparison operators, a MISSING as either argument will be treated as NULL, and the entire result shall be NULL.

Example: Boolean Operators

MISSING as either argument will be treated as NULL, and the truth tables from above in semantics of boolean operators is followed.

Example: Control Flow Operators

There is no special handling for NULL or MISSING in conditions; cases with conditions that evaluate to NULL or MISSING are skipped. See operators description above.

Example: GROUP BY Keys and DISTINCT

For the purposes of GROUP BY keys, and the DISTINCT keyword, MISSING is converted to NULL, and NULL is considered distinct from all non NULL values.

Example Document Constructors

For any expression that results in a missing value in a document, the system is configured to remove the associated key from the document, for example:

```
ρ_c:( test: {
    bar: [
        {'a':41, 'b':42},
        {'c':23}
    ]
    }
)
SELECT VALUE {'a': a} FROM test.bar AS bar
```

Results in:
{'a': 41}
{ }
Because the 'a' key is MISSING in the second document.

Example: Array Constructors

In array constructors, MISSING is converted to NULL. Consider again the catalog from the above description of document constructors example, and the following query:
SELECT VALUE {'a': [a]} FROM test.bar AS bar
Will result in:
{'a': [41]}
{'a': [null]}
Because the MISSING 'a' key in the second document is converted to NULL.

Example Underlying Query Language Integration: MQL Scalar Functions

Any MQL scalar functions exposed through the system (and e.g., MongoSQL) is defined to have the same NULL/MISSING semantics as the underlying scalar functions. By translating directly to the MQL scalar functions, the system improves query performance.

Example Differences in Handling of NULL and MISSING in Aggregation Expressions vs MQL Find Language NULL/MISSING can be treated differently in aggregation expressions vs a MQL find—described in greater detail below with examples on NULL/MISSING in Aggregation vs Find.

Example Scoping Rules

Example: Scoping for Value Names

As in any programming language, the system (and e.g., MongoSQL) semantics have to deal with issues of name scope. For example, how are references to foo resolved in the following query with the following catalog:

```
SELECT foo.hello AS hello
FROM test.bar AS foo
WHERE foo.hello = ANY (SELECT foo.goodbye FROM test.foo AS foo)
ρ_c = {
    test: {
        foo: [
            { foo: { bar: 1 }, bar: 2, goodbye: "friend"}
        ],
        bar: [
            { hello: "world" },
            { hello: "friend" }
        ]
    }
}
```

Generally, for each evaluation of a clause, the values environment tuple is concatenated with the current input tuple. Names that exist only in the values environment are therefore drawn from the values environment. Names that exist only in the input tuple are therefore drawn from the input tuple. Names that exist in both are drawn from the input tuple since those have the closer scope.

Back to the example: Since this is a SQL query, the foo in foo.goodbye resolves to the variable foo defined by the inner query's FROM clause. Technically, this scoping rule is captured by the following handling of documents:

The inner query (and, therefore, it's FROM clause) is evaluated with a values environment $\rho_0=\langle$ foo: v$\rangle$; this foo is the one defined by the outer FROM, which is test.bar. Then the inner FROM clause outputs a stream of binding tuples of the form t=$\langle$ foo: v$\rangle$; this foo is defined by the inner FROM, which is test.foo. Then the expression foo.goodbye is evaluated once for each tuple t in the stream, in the environment $\rho_{select}$ tupleConcat($\rho_0$, t).

Because foo appears in both $\rho_0$ and t, the concatenation keeps only the foo value from its right argument (t) as given in the rules in description above on syntax & semantics. Essentially, by putting t as the right argument of the concatenation, the variables of t have precedence over synonymous variables in the left argument ($\rho_0$).

Example Determining Qualification for References

Qualified references are references formed as q.x, where q is the qualifier. However, as seen in examples and description above of document and field-access expressions, d.x is an access to field x in document d. Thus the need in various embodiments to make clear rules to determine whether foo.bar in a given position is a qualified reference or a document field access. The system disambiguates by looking at the data source names in the values environment (at any nesting depth). If foo is one of the data source names, the system uses that "foo." as a qualification instead of a field reference in a document named foo.

This leads to further implementation based on the following question, how does one access the bar field under the foo field in the test.foo collection from pc in our above example, if foo is a current qualified name? There are multiple options and three examples are described: alias foo to something else in the FROM clause, use foo.foo.bar, or use foo['bar'], because [ ] field access is not ambiguous.

Example:
SELECT foo.bar FROM foo AS foo
Here, foo.bar is the qualified field bar from foo. So the result is:
{'bar': 2}
If access the foo field in foo, write any of the following:
SELECT foo.bar FROM foo AS f
or
SELECT foo.foo.bar FROM foo AS foo
or
SELECT foo['bar'] FROM foo AS foo
each of which would result in:
{'bar': 1}

Note that a given FROM clause can introduce multiple data source quantifiers: FROM foo AS foo JOIN bar AS bar introduces both foo and bar as name qualifiers. Additionally, qualifiers can come from smaller scope numbers in the case of correlated subqueries: SELECT (SELECT * FROM foo WHERE foo.x=bar.x) FROM bar, here, bar.x is a qualified reference because bar is a data source quantifier with a smaller scope number.

Example Operation: Determining Datasources for References

According to various embodiments, the following algorithm is applied statically at query planning time to determine which (e.g., MongoDB) datasource to associate. In some embodiments, the system is configured so that no dynamic datasource decisions are made during query execution. For example, if a query passes query planning stage, and a value is missing at runtime, it becomes a MISSING value. In another example, if it is missing statically, it is an error during query planning.

Example Definitions:
MUST contain f=>system has a schema that proves a datasource is guaranteed to have the top-level field f
CANNOT contain f=>system has a schema that proves a datasource cannot contain the top-level field f
MAY contain f=>system cannot prove or disprove the existence of a top-level field f in a datasource Qualified Reference Resolution Example
Qualified Reference: q.f1(.f2 . . . fn)
Resolve the qualifier q to a datasource
once resolved the datasource, resolve the field by accessing the subpath f1.(f2 . . . fn) in that datasource's top-level document
By the definition of a qualified reference, there is guaranteed to be at least one key (n, d) in the environment such that n=q
To resolve the qualifier q, consider all the keys (n, d) with n=q, and choose the one with the largest value for d Unqualified Reference Resolution Example
Unqualified reference: f1(.f2 . . . fn)
Once resolved the datasource, resolve the field by accessing the subpath f1.(f2 . . . fn) in that datasource's top-level document
resolve the implicit qualifier q to a datasource
If there is only a single datasource C such that C MUST or MAY contain f1, resolve q to that datasource
Else, apply the following algorithm, starting with the largest nesting depth d.
Consider all bindings at the current nesting depth
If all such bindings CANNOT contain f1, continue at the next-smallest nesting depth d−1
If there is more than one such binding that MUST or MAY contain f1, error
Note: This is the case that covers non-subquery-related ambiguities like SELECT a FROM foo JOIN bar
If there is exactly one such binding that MUST contain f1, resolve q to that datasource
Else (i.e. if there is exactly one binding that MAY contain f1), error
Note: this is the case that covers correlation-related ambiguities. Generate error here because it means that the field could possibly resolve to multiple different nesting depths.
If the above algorithm does not resolve q to any datasource, return a "field not found" error Example Operation: Resolving Collection References In various embodiments, Identifiers that reference collections are distinct from other references, and can be statically disambiguated based on their position in the query: collection references occur in FROM clauses, and regular references to fields cannot occur in FROM clauses. A collection reference may be a qualified reference or not, with the qualification denoting a database rather than a datasource. Unlike expression positions, there are no field references allowed in FROM clauses: any FROM clause reference containing '.' is qualified. All unqualified references in FROM clauses are turned into qualified references by prefixing the current database.

Examples of General Features
Example Document Key Ordering Semantics & Behavioral Description Various embodiments (and e.g., MongoSQL) do not provide any guarantees about the ordering of keys in documents. This means that any document value may be returned from a query with its keys in an arbitrary order, whether that document was created by a literal, selected unmodified from a collection, or otherwise. In practice, document keys are often be returned in the order they are specified in a literal or the order they are stored in the database, but users should not rely on this behavior.

Various embodiments (and e.g., MongoSQL) do not implement any functionality that depends on the orderedness (or unorderedness) of document keys. This limitation is intentional; as such implementation permits the flexibility to decide in the future that documents are ordered or unordered. In some examples, this results in comparison operators (and some uses of clauses that implicitly perform comparisons, like ORDER BY, GROUP BY, and SELECT DISTINCT) that are disallowed over document fields.

Example MongoSQL Implementation—Examples of Exceptional Behavior

In various embodiments, MongoSQL has two categories of exceptional behavior:
  Static errors
  Undefined Behavior As discussed above, a MongoSQL query can be defined to avoid a runtime error. Any runtime error that causes a termination of a query is viewed as a bug. It is common in the analytics world for queries to run for hours, or even days, so runtime errors are a particularly undesirable failure mode Example Static Errors The system is configured to detect as many exceptional situations as possible at compile time so to return a static error. For example, static errors immediately halt execution and allow the user to correct the problem with their query. Some examples of static errors:
  Ambiguous references or duplicate binding tuple names
  Scalar subqueries not guaranteed to return 0 or 1 binding tuples
  Arguments to operators and scalar functions that cannot be statically determined to be the expected types
  References known to be MISSING, statically
    System assigns MISSING as something that is not intended behavior Example Undefined Behavior Not every observable behavior is guaranteed by various embodiments implementing the described specification and the examples above. Behaviors that are not guaranteed are referred to as "Undefined Behavior" (UB). UB should not be relied upon, as it may differ between implementations or be changed at any time.

In some examples, the reason for having UB is to prevent certain kinds of implementation details from leaking into the specification without incurring an unreasonable runtime cost. For example, MQL will upconvert ints to doubles on arithmetic overflow, which is an undesirable behavior that may cause problems for BI Tools. Instead of wrapping every integer addition translation in an expensive and unidiomatic conditional that detects when overflow will occur, the system instead declares the integer overflow behavior to be UB.

Example Optimization and Features
  Exposing MongoDB-specific Types in ODBC/JDBC
    One example to expose MongoDB-specific types (like ObjectId) via ODBC/JDBC is custom types in JDBC/ODBC.
    If custom types do not work, a second option is to expose the whole BSON value (including type tag) as binary data.
      Distinguish between whole BSON values represented as binary data and actual BSON BinData values can be implemented
    The system can also fall back to inferring when string literals in queries are actually supposed to be ObjectId literals
      This implementation can be an op-in feature flag and could be used by JDBC and ODBC drivers.

Example: Date and Time Types

BSON includes a Date type and a Timestamp type. The BSON Date type represents a datetime; i.e., it consists of a date part and a time part. The BSON Timestamp type is a special type intended for internal MongoDB use.

The SQL-92 specification includes a Date type, a Time type, and a Timestamp type. The SQL-92 Date type represents a date without a time; i.e., it only consists of a date part. The SQL-92 Time type represents a time without a date; i.e., it only consists of a time part. The SQL-92 Timestamp type represents a datetime; i.e., it consists of a date part and a time part, meaning it is the same as the BSON Date type.

Since various embodiments are implemented to be consistent with BSON types some implementations are not currently supporting the SQL DATE or TIME type. Other embodiments provide support, and others allow opt-in on these types.

The same approach can be implemented in some embodiments for other places where the BSON type system deviates from the SQL standard. For example, the system can include semantic support for parameterized types like VARCHAR(3) in some embodiments, and others allow opt-in.

Example Operation Exposing MQL Functionality

In further embodiments, the system is configured to provide a way to access arbitrary MQL expressions via MongoSQL, so that users can leverage MQL expressions without the need for adding explicit support for each one in MongoSQL itself.

Example: Collations

A number of clauses in standard SQL allow users to explicitly specify the collation that should be used for comparisons (ORDER BY and GROUP BY, for example). Some embodiments (and e.g., MongoSQL) do not allow this feature, but others can implement collations as above, and still other provide this feature as opt-in.

Other examples of not implemented, implemented, and opt-in available include intra-type comparisons for strings, and where collations control structured-data comparisons (for example, how key order and duplicate keys are treated in document comparisons) and inter-type comparisons (for example, how a document and a boolean compare)

Example: ORDER BY Arbitrary Expressions

In various embodiment, the system allows ORDER BY sort keys to be column names or integer literals. Further embodiments expand this function to enable arbitrary expressions.

Example: Supporting Non-Document BSON Values in Query Results

For now, only documents are returned as the values in binding tuples. The system can relax this in the future to allow for something such as SELECT VALUE [a, b] FROM foo. This will require a slight rework on how the binding names are modified in derived tables because that currently uses $mergeObjects on the underlying values of the original binding tuples from the SELECT clause of the derived table query.

Example: Unify Arrays and Subqueries

In further embodiments, the system supports operations currently reserved for subqueries over arrays as well (and vice versa). The support features include some or all of the following (according to various embodiments):

Support IN, ANY, and ALL expressions with array values on the RHS

Support a syntax for using a subquery's entire result set as an array value

Example Formal Definitions Used to Describe Examples and Embodiments tupleConcat Example tupleConcat: P×P→P tupleConcat is formally defined using the following rules. In the rules, variables x are keys, v are BSON values, x: v is a binding from a binding tuple key x to BSON value v, and variables X are arbitrary sequences of key, value bindings. Note that variables X are allowed to match the empty binding.

1. tupleConcat(⟨(x, n): $v_0$, $X_1$⟩, ⟨(x, n): $v_1$, $X_2$⟩)⇒ tupleConcat(⟨(x, n): $v_1$, $X_1$⟩, ⟨$X_2$⟩)
2. tupleConcat(⟨($X_0$), ⟨$X_1$⟩)⇒⟨$X_0$, $X_1$⟩ otherwise These rules describe how the system is configured to merge binding tuples: if two keys have the same name between the two binding tuples, the system is configured to choose the one from the right binding tuple. Duplicate keys within one binding tuple are undefined behavior, and the implementation is free to leave them or remove them, and choose which duplicate to remove, if removal is chosen. The following example shows how these rules are applied:

tupleConcat(⟨(x, 0): 1, (y, 0): 13, (z, 0): 4⟩,
⟨(x, 0): 3, (a, 0): 1, (z, 0): 14⟩)
Apply rule 1:
tupleConcat(⟨(x, 0): 3, (y, 0): 13, (z, 0): 4⟩,
⟨(a, 0): 1, (z, 0): 14⟩)
Apply rule 1:
tupleConcat(⟨(x, 0): 3, (y, 0): 13, (z, 0): 14⟩,
⟨(a, 0): 1⟩)
Apply rule 2:
⟨(x, 0): 3, (y, 0): 13, (z, 0): 14, (a, 0): 1⟩

And no more rules can be applied, this is the result.

The system can extend tupleConcat over arrays of binding tuples as follows, given an array arr:

tupleConcat($d_0$, arr)=[tupleConcat($d_0$, x) for x∈arr]
Similarly:
tupleConcat(arr, $d_0$)=[tupleConcat(x, $d_0$) for x∈arr]
And:
tupleConcat($arr_0$, $arr_1$)=[tupleConcat(x.y) for x∈$arr_0$, for y∈$arr_1$]

Example Implementation Considerations for Transitions to MQL

Example: MQL Runtime Errors

The system can be configured handle various run-time errors exhibited by an underlying/native query language as part of integrated structured query language processing into dynamic and/or schemaless databases. The follow examples illustrate examples of error handling. A non-exhaustive list of runtime errors thrown by MQL as determined from the MQL documentation follows, where various embodiments are configured to handle these errors as part of translation with MQL. The $convert operator can be used to catch errors.

$a cos: throws an error for input values outside of [−1, 1] or non-numeric input $a cos h: throws an error for input values outside of [−1, ∞) or non-numeric input $a sin: throws an error for input values outside of [−1, 1] or non-numeric input $a tan h: throws an error for input values of exactly 1 and −1 or non-numeric input $binarySize: throws an error for input that is not a string, binary, or BSON null $bsonSize: throws an error for input that is not a document or BSON null $convert: can throw an error if no onError attribute is specified and the expression to be converted throws an error or if an error occurs dugin conversion $convert may be used as an error handler because of this behavior $ cos: throws an error for input values of −∞ and ∞ or non-numeric input $dateFromParts: throws errors for out of range parts, for example in MongoDB 4.4 this means:
year: 1-9999
isoWeakYear: 1-9999
month: 1-12
isoWeek: 1-53
day: 1-31
isoDayOfWeek: 1-7
hour: 0-23
minute: 0-59
second: 0-59
millisecond: 0-999
any non-conformant timezone $dateFromString: a convenience function for $convert, works as $convert and errors as $convert $dayOfMonth: throws an error if argument is not a Mongo data object $dayOfWeek: throws an error if argument is not a Mongo data object $dayOfYear: throws an error if argument is not a Mongo data object $first: throws an error if argument is not an array, MISSING, or BSON null $geoNear: throws an error if there is more than one 2d index or more than one 2d sphere index and a key is not provided $hour: throws an error if argument is not a Mongo data object $in: throws an error in either of the following cases: if the $in expression is not given exactly two arguments, or if the second argument is not an array $indexOfArray: throws an error if the first argument is not an array, BSON null, or MISSING.

$indexOfCP: throws an error if the first argument is not a string, BSON null, or MISSING.

$isoDayOfWeek: throws an error if argument is not a Mongo data object $isoWeek: throws an error if argument is not a Mongo data object $isoWeekYear: throws an error if argument is not a Mongo data object $last: throws an error if argument is not an array, MISSING, or BSON null $millisecond: throws an error if argument is not a Mongo data object $minute: throws an error if argument is not a Mongo data object $month: throws an error if argument is not a Mongo data object $replaceAll: throws an error if any argument is not a string or BSON null (it throws an error if any argument is MISSING).

$replaceOne: throws an error if any argument is not a string or BSON null (it throws an error if any argument is MISSING).

$round: throws an error if any argument is not numeric, MISSING, or BSON null $second: throws an error if argument is not a Mongo data object $ sin: throws an error for input values of −∞ and ∞ or non-numeric input $ sin h: throws an error for non-numeric input $size: throws an error if the input is not an array (it errors for MISSING or BSON null)

$split: throws an error on non-string/BSON null/MISSING input $sqrt: throws an error on non-numeric/BSON null/MISSING input or on negative numeric input $substrBytes: throws an error if there are not exactly three arguments, or if either index results in a byte in the middle of a UTF-8 rune. It does not error on inputs that are not strings $substrCP: throws an error if there are not exactly three arguments. It does not error on inputs that are not strings $switch: throws an error if no default is specified and no case matches $ tan: throws an error for input values of −∞ and ∞ or non-numeric input $ tan h: throws an error for non-numeric input $toBool, $toDate, $toDecimal, $toDouble, $toInt, $toLong, $toObjectId, $toString: a convenience function for $convert, works as $convert and errors as $convert $trunc: throws an error for non-numeric input $week: throws an error if argument is not a Mongo data object $year: throws an error if argument is not a Mongo data object $zip: if any argument is not an array, or useLongestLength is set to true and no defaults are specified or are empty.

Additionally, additional known errors that are not in the documentation include:

$add: throws an error on non-numeric/BSON null/MISSING input $ cos h: throws an error for non-numeric input $divide: throws an error on non-numeric/BSON null/MISSING input $multiply: throws an error on non-numeric/BSON null/MISSING input $subtract: throws an error on non-numeric/BSON null/MISSING input $ sin h: throws an error for non-numeric input $ tan h: throws an error for non-numeric input Example: NULL/MISSING in Aggregation vs Find For the purposes of the MQL find language and integration into various embodiments, the MQL is also the default language of the $match aggregation stage, NULL and MISSING are treated the same. In other parts of MQL aggregation, NULL and MISSING are treated as distinct for the purposes of the $eq function.

Example:

```
> db.nm.find( )
{ "_id" : ObjectId("5fd50cdebe80dc7690b03783"), "a" : 1 }
{ "_id" : ObjectId("5fd50ce0be80dc7690b03784"), "a" : 2 }
{ "_id" : ObjectId("5fd50ce3be80dc7690b03785"), "a" : null }
{ "_id" : ObjectId("5fd50ce5be80dc7690b03786") }
```

-continued

```
> db.nm.find({"a": {"$eq": null}})
{ "_id" : ObjectId("5fd50ce3be80dc7690b03785"), "a" : null }
{ "_id" : ObjectId("5fd50ce5be80dc7690b03786") }
> db.nm.aggregate({"$addFields": {"out": {"$eq": ["$a", null]}}})
{ "_id" : ObjectId("5fd50cdebe80dc7690b03783"),
  "a" : 1, "out" : false }
{ "_id" : ObjectId("5fd50ce0be80dc7690b03784"),
  "a" : 2, "out" : false }
{ "_id" : ObjectId("5fd50ce3be80dc7690b03785"),
  "a" : null, "out" : true }
{ "_id" : ObjectId("5fd50ce5be80dc7690b03786"), "out" : false }
```

MISSING and NULL, however, are also treated the same in the $group stage for the purposes of grouping:

```
> db.nm.aggregate({"$group": {"_id": "$a"}})
{ "_id" : 2 }
{ "_id" : 1 }
{ "_id" : null }
```

As mentioned above with reference to GROUP BY keys and Distinct, there are some examples where MQL does not currently treat NULL and MISSING the same. Various embodiments of the translations are configured to address this bug. Some embodiments identify environments where the bug is in place and are configured to invoke the resolution, where others can determine the bug is not at issue and proceed accordingly.

Figure 2:
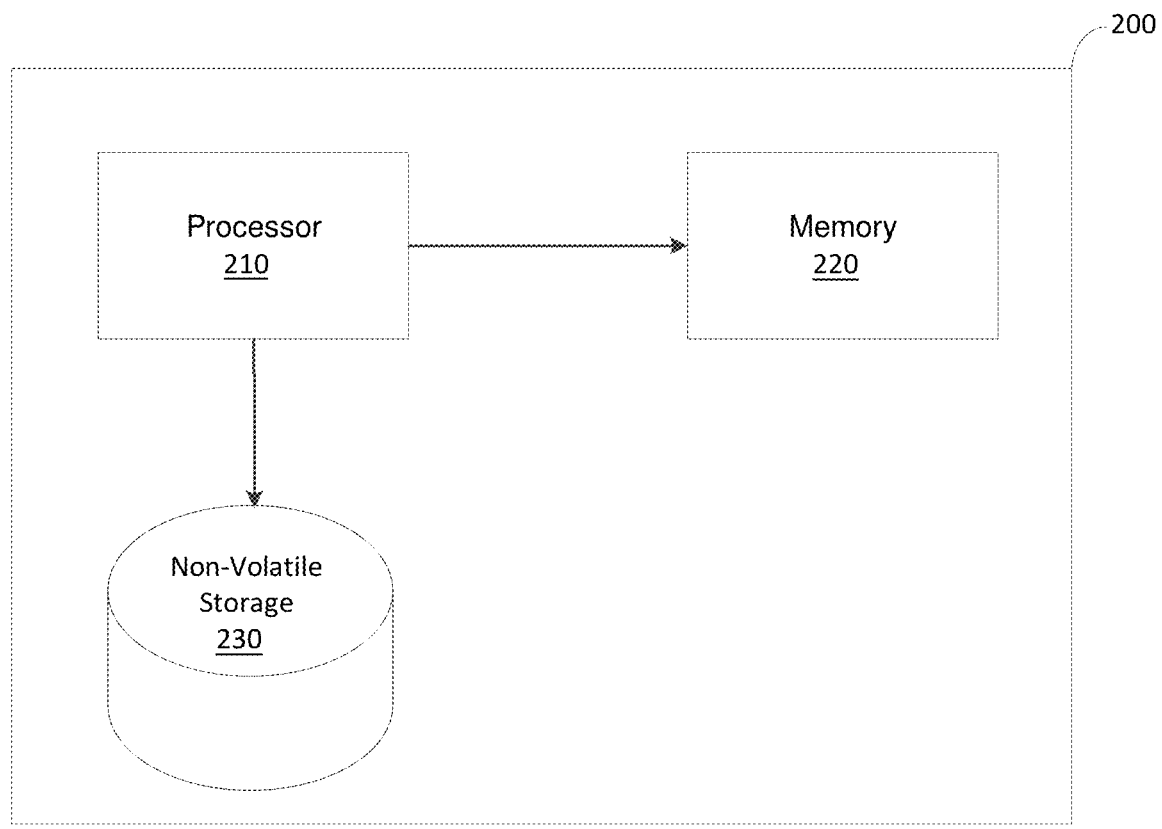
FIG. 2 is an example block diagram of a special purpose computer system that can be improved based on execution of the functions discussed herein.

Modifications and variations of the discussed embodiments will be apparent to those of ordinary skill in the art and all such modifications and variations are included within the scope of the appended claims. An illustrative implementation of a computer system 200 that may be used in connection with any of the embodiments of the disclosure provided herein is shown in FIG. 2. The computer system 200 may include one or more processors 210 and one or more articles of manufacture that comprise non-transitory computer-readable storage media (e.g., memory 220 and one or more non-volatile storage media 230). The processor 210 may control writing data to and reading data from the memory 220 and the non-volatile storage device 230 in any suitable manner. To perform any of the functionality described herein, the processor 210 may execute one or more processor-executable instructions stored in one or more non-transitory computer-readable storage media (e.g., the memory 220), which may serve as non-transitory computer-readable storage media storing processor-executable instructions for execution by the processor 210.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to figures and functions above, the various system components, analysis algorithms, processing algorithms, etc.) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

The invention claimed is:

1. A distributed database system comprising:
   at least one processor operatively connected to a memory;
   a distributed database including data stored under a dynamic schema architecture or an unstructured architecture;
   a query engine, executed by the at least one processor, configured to:
     accept a user defined query;
     execute the user defined query against the distributed database;
     identify structured query language elements and native query language elements comprising at least in part unstructured query operators in the user defined query;
     define a first native query stage of execution for the native query language elements and a first structured query language stage for execution of the structured query language elements;
     map structured query language semantics for execution on unstructured data in the distributed database;
     execute both of the first structured query stage and the first native query stage on source database data comprising the unstructured data wherein at least some functions of the unstructured query operators are performed on the unstructured data directly in the first native query stage and at least some functions of the structured query language elements are performed on the unstructured data directly in the first structured query stage; and
     output results of the executed stages, including results from the structured query language semantics for communication to the user or for further processing by another query stage.

2. The system of claim 1, wherein the structured query language semantics are associated with an operation to be performed and the query engine is further configured to map the structured query language semantics to a data environment, the data environment configured to manage execution of the structured query language semantics.

3. The system of claim 2, wherein the query engine is further configured to define a catalog environment and values environment during execution of the first structured query language stage and determine binding values associated with respective data environments on which the operation is to be performed.

4. The system of claim 3, wherein the query engine is further configured to execute the operation on the binding values; and translate the binding values into a native processing format as an output result or input to a further processing stage.

5. The system of claim 2, wherein the query engine is further configured to stream output binding values to subsequent operations in the user defined query.

6. The system of claim 1, wherein the query engine is further configured to preserve semantics of the native query language on which the structured queries are mapped.

7. The system of claim 1, wherein the query engine is further configured to execute compile time evaluation of the user defined query.

8. The system of claim 7, wherein the query engine is further configured to execute the compile time evaluation regardless of availability of schema information for source data.

9. The system of claim 7, wherein the query engine is further configured to infer probable schema information based on the user defined query.

10. The system of claim 7, wherein the query engine is further configured to perform static type-checking and result set metadata computation without requiring source schema information prior to execution of the user defined query.

11. A computer implemented method for managing a distributed database system, the method comprising:
    accepting, by at least one processor, a user defined query;
    executing, by the at least one processor, the user defined query against the distributed database including data stored under a dynamic schema architecture or an unstructured architecture;
    identifying, by the at least one processor, structured query language elements and native query language elements comprising at least in part unstructured query operators in the user defined query;
    defining, by the at least one processor, a first native query stage of execution for the native query language elements and a first structured query language stage for execution of the structured query language elements;
    mapping, by the at least one processor, structured query language semantics for execution on unstructured data in the distributed database;
    executing, by the at least one processor, both of the first structured query stage and the first native query stage on source database data comprising the unstructured data wherein at least some functions of the unstructured query operators are performed on the unstructured data directly in the first native query stage and at least some functions of the structured query language elements are performed on the unstructured data directly in the first structured query stage; and
    outputting, by the at least one processor, results of the executed stages including results from the structured query language semantics for communication to the user or for further processing by another query stage.

12. The method of claim 11, wherein the structured query language semantics are associated with an operation to be performed and the method further comprises:
    defining, by the at least one processor, a data environment for managing execution of the structured query language semantics; and
    mapping, by the at least one processor, the structured query language semantics to the data environment on which to perform the operation.

13. The method claim 12, wherein the method further comprises defining, by the at least one processor, a catalog environment and values environment during execution of the first structured query language stage and determining, by the at least one processor, binding values associated with respective data environments on which the operation is to be performed.

14. The method of claim 13, wherein the method further comprises:
    executing, by the at least one processor, the operation on the binding values; and
    translating, by the at least one processor, the binding values into a native processing format as an output result or input to a further processing stage.

15. The method of claim 12, wherein the method further comprises streaming, by the at least one processor, output binding values to subsequent operations in the user defined query.

16. The method of claim 11, wherein the method further comprises preserving, by the at least one processor, semantics of the native query language on which the structured queries are mapped.

17. The method of claim 11, wherein the method further comprises executing, by the at least one processor, compile time evaluation of the user defined query.

18. The method of claim 17, wherein the method further comprises executing, by the at least one processor, the compile time evaluation regardless of availability of schema information for source data.

19. The method of claim 17, wherein the method further comprises inferring, by the at least one processor, probable schema information based on the user defined query.

20. The method of claim 17, wherein the method further comprises performing, by the at least one processor, static type-checking and result set metadata computation without requiring source schema information, prior to execution of the user defined query.

* * * * *